(12) United States Patent
Kempf

(10) Patent No.: US 7,729,520 B2
(45) Date of Patent: Jun. 1, 2010

(54) BIOMETRIC ACOUSTIC WRITING SYSTEM AND METHOD FOR IDENTIFYING INDIVIDUALS AND RECOGNIZING HANDWRITING BY USING BIOMETRIC DATA

(75) Inventor: Jürgen Kempf, Donaustauf (DE)

(73) Assignee: Fachhochschule Regensburg (DE)

( * ) Notice: Subject to any disclaimer, the term of this patent is extended or adjusted under 35 U.S.C. 154(b) by 1130 days.

(21) Appl. No.: 10/526,715

(22) PCT Filed: Sep. 4, 2003

(86) PCT No.: PCT/FR03/09814

§ 371 (c)(1),
(2), (4) Date: Jan. 6, 2006

(87) PCT Pub. No.: WO2004/023382

PCT Pub. Date: Mar. 18, 2004

(65) Prior Publication Data
US 2006/0161992 A1    Jul. 20, 2006

(30) Foreign Application Priority Data
Sep. 4, 2002   (DE) ................ 102 41 328
Jun. 24, 2003  (DE) ................ 103 28 345

(51) Int. Cl.
G06K 9/00   (2006.01)
G06K 19/00  (2006.01)
G06F 21/00  (2006.01)
G06F 3/033  (2006.01)

(52) U.S. Cl. .............. 382/119; 382/115; 713/186; 340/5.52; 178/19.01

(58) Field of Classification Search ........ 382/100, 382/124, 184, 119, 311, 115, 181, 187, 309; 713/180, 186, 176, 193, 182, 194, 189, 150, 713/168; 401/195; 178/19.01, 18.09, 18.03, 178/18.01; 705/76; 340/5.1, 5.2, 825, 5.4, 340/5.52, 5.51; 235/386, 375; 345/179, 345/156; 346/139 R; 726/34
See application file for complete search history.

(56) References Cited

U.S. PATENT DOCUMENTS

| | | | |
|---|---|---|---|
| 3,955,178 A | 5/1976 | Warfel | |
| 4,122,435 A | 10/1978 | Greenaway | |
| 4,513,437 A | 4/1985 | Chainer et al. | |
| 5,294,792 A | 3/1994 | Lewis et al. | |
| 5,333,209 A | 7/1994 | Sinden et al. | |
| 5,546,565 A | 8/1996 | Suzuki | |
| 5,774,571 A * | 6/1998 | Marshall | 382/119 |
| 6,208,755 B1 | 3/2001 | Mori et al. | |
| 6,259,438 B1 * | 7/2001 | Fleck et al. | 345/184 |

(Continued)

FOREIGN PATENT DOCUMENTS

DE    32 28 968 A1    2/1984

(Continued)

*Primary Examiner*—Sheela C Chawan
(74) *Attorney, Agent, or Firm*—Moore & Van Allen PLLC; Steven B. Phillips

(57) ABSTRACT

Biometric writing system having a pen housing (3) for carrying out hand-guided movements on a substrate (4) at least one microphone (5), which is integrated in a housing (3), for acoustic recording of sound signals which are caused by the hand-guided movements; and a data processing unit (ii) for calculation of biometric data as a function of the recorded sound signals.

20 Claims, 16 Drawing Sheets

U.S. PATENT DOCUMENTS

| | | | |
|---|---|---|---|
| 6,456,749 B1 * | 9/2002 | Kasabach et al. | 382/314 |
| 6,603,464 B1 * | 8/2003 | Rabin | 345/179 |
| 7,176,906 B2 * | 2/2007 | Williams et al. | 345/179 |

FOREIGN PATENT DOCUMENTS

| | | |
|---|---|---|
| DE | 42 00 170 C2 | 11/1994 |
| DE | 196 44 109 A1 | 5/1997 |
| DE | 198 56 296 A1 | 6/2000 |
| DE | 100 19 165 A1 | 10/2001 |
| DE | 100 28 138 A1 | 12/2001 |
| FR | 2 643 736 | 8/1990 |
| JP | 07028593 | 1/1995 |
| WO | WO 01/43058 A1 | 6/2001 |

* cited by examiner

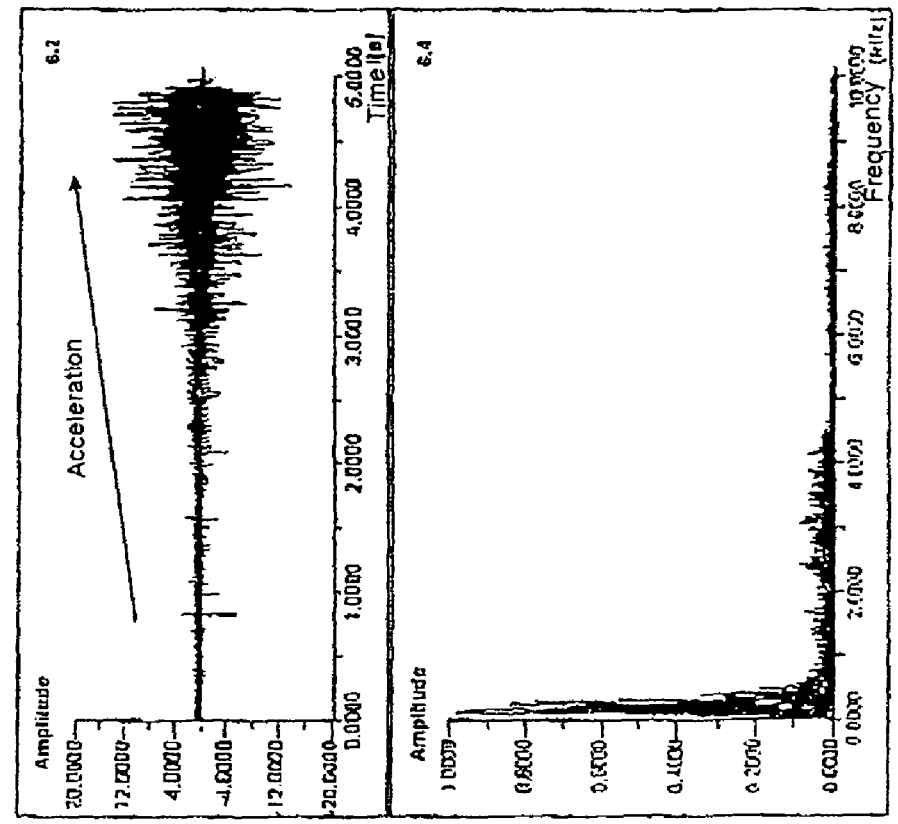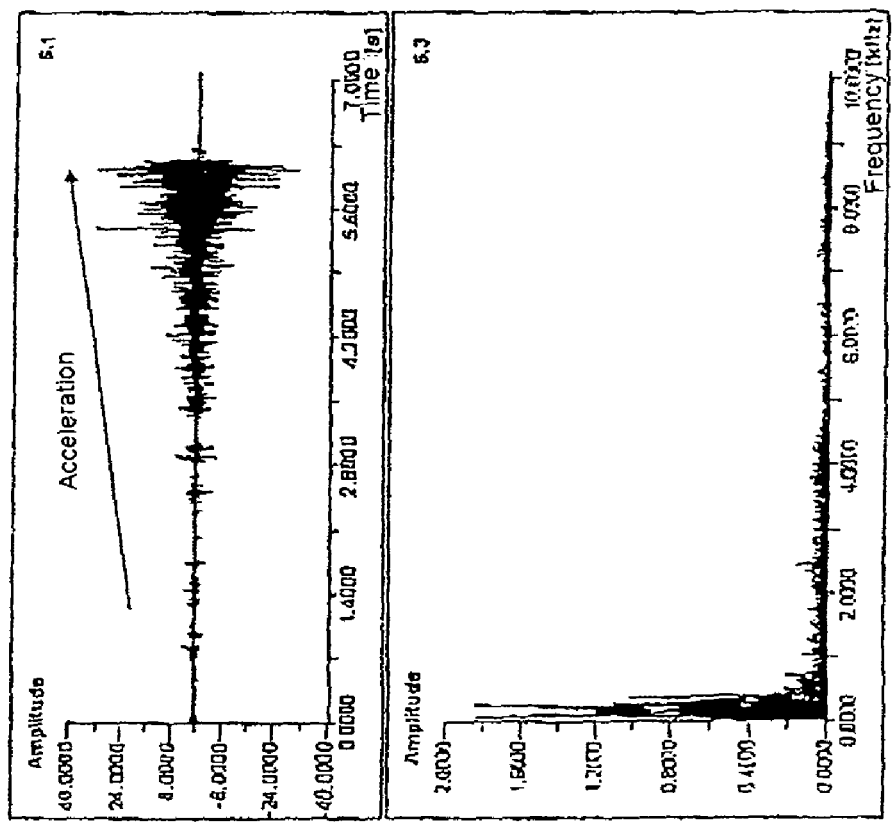

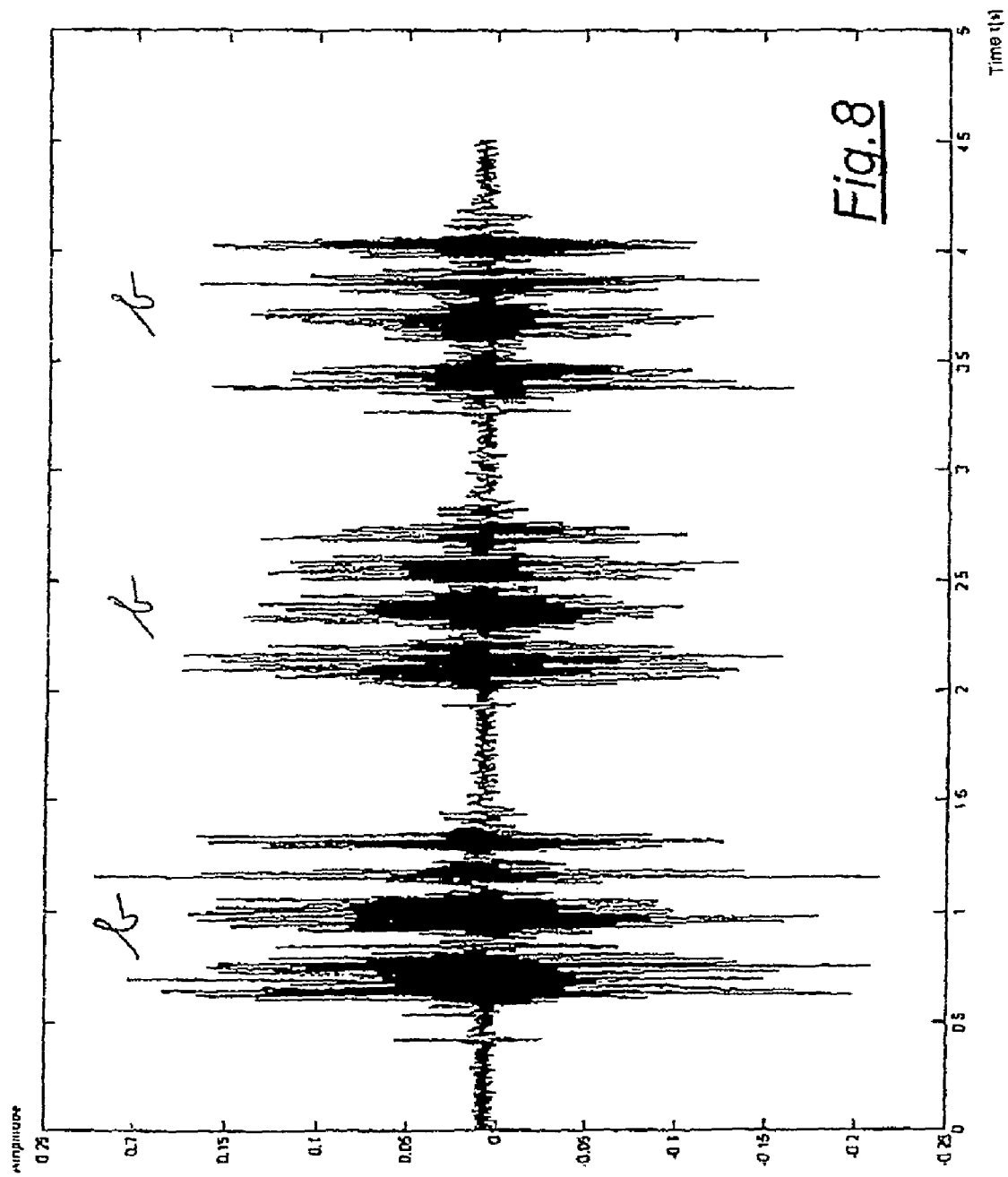

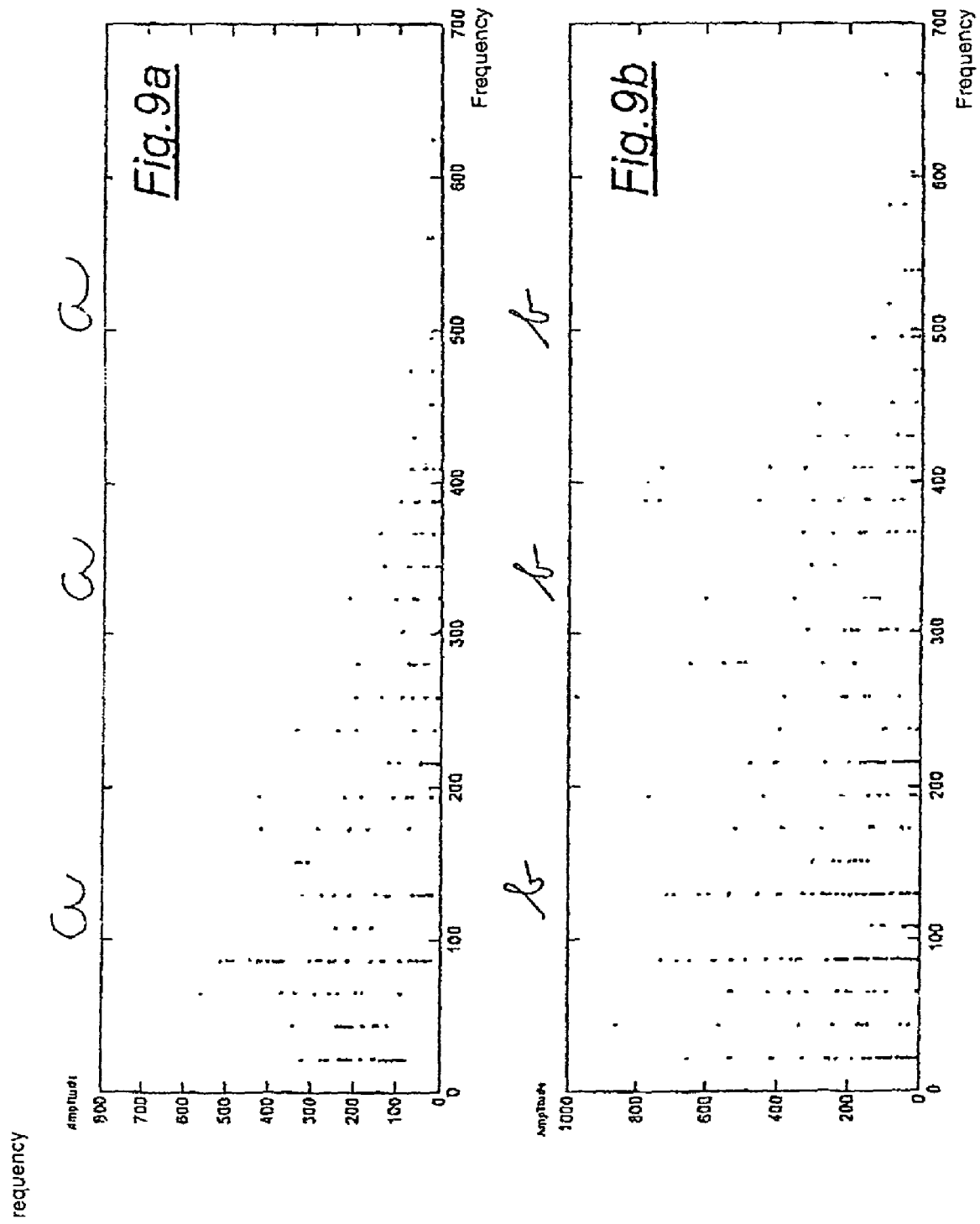

BIOMETRIC ACOUSTIC WRITING SYSTEM AND METHOD FOR IDENTIFYING INDIVIDUALS AND RECOGNIZING HANDWRITING BY USING BIOMETRIC DATA

The invention relates to a biometric acoustic writing system, in which the sound signals which are produced by the hand-guided movement of the pen are recorded acoustically by means of a microphone which is integrated in a pen appliance, and they are then processed to form biometric data. The invention also relates to a method for personal identification and personal verification by means of a biometric writing system, and to a method for handwriting identification and/or handwritten sketch identification.

Currently, there are a large number of competing biometric systems. The majority of the biometric systems are currently in the form of systems which use finger lines as identification features, followed by systems for face identification, and so-called Iris scanners.

The importance of electronic password and signature identification is becoming continuously more important as a result of increasing electronic networks in all fields of business life. Conventional contracts are closed by the two contract partners by providing a signature for documentation. The signature is in this case used for verification purposes and is specific to the person providing the signature. When contracts are closed in the field of E-commerce, the contract partners have to provide an electronic signature for their identification, its validity must be verified. One precondition for the widespread use of an electronic signature for verification of the identity of the contract partners is a high degree of confidence for the electronic signature that is provided cannot be falsified.

Furthermore, the signature which is provided must be identified with a high identification rate, and must be transmitted to a remote computer. It is also essential that the electronic signature for a large group of people can be entered in a simple manner without any special knowledge.

The writing systems which are already known do not satisfy these requirements, and in some cases have serious disadvantages.

Pens with acceleration sensors are known (for example accelerometer-based pens from British Telecommunications) for detection of acceleration forces while writing with the pen. The disadvantage of this known pen is the comparatively low identification rate for signature verification, because the data area is only two-dimensional. Furthermore, the pen must always be aligned in the same way while writing, that is to say the angle between the pen and the substrate must be very largely constant, so that a natural writing behaviour is not ensured when providing the signature. Furthermore, an acceptable identification rate is dependent on a minimum writing speed since, otherwise, the measured acceleration forces are too small.

A large number of writing systems identify handwritten text or characters by means of the writing substrate. All such writing systems have the disadvantage that specific writing substrates are required, with appropriate signal processing.

U.S. Pat. No. 4,513,437 discloses a data input pen for signature verification. The pen contains a pen for visualization of what has been written on a substrate, as well as piezoelectric pressure and acceleration sensors for recording acceleration forces which are caused by transversal writing movements of the pen on the writing substrate. Furthermore, the pressure on the pen is recorded in a direction parallel to the axis of the pen.

The disadvantage of the data input pen described in U.S. Pat. No. 4,513,437 is that pronounced acceleration forces are required during writing. Major direction changes and/or speed changes in straight-line writing movements are thus required for signal recording.

The documents U.S. Pat. No. 5,294,792 A, U.S. Pat. No. 5,333,209 A, U.S. Pat. No. 6,208,755 B1, DE 196 44 109 A1 and DE 100 28 138 A1 describe writing systems for recording writing pressure dynamics by means of pressure sensors and writing movement data by means of CCD sensor systems.

Writing systems are known in which a pen for carrying out hand-guided movements on a substrate is integrated in a pen appliance. The pen appliance contains an optical sensor device for recording the movements carried out with the pen, as movement or position data. Furthermore, a further pressure sensor device is integrated in the pen appliance, in order to record the forces which occur while the movements of the pen are being carried out. A data processing unit is used to calculate biometric data as a function of the recorded movement data and the recorded writing pressure data.

Commercial writing appliances already exist which are equipped with the sensor techniques mentioned above.

For example, the so-called Anoto-digital pen describes a writing system in which written text can be transferred to a computer. The pen is in the form of a ball-point pen with an integrated digital camera. A force sensor detects that the tip of the refill has been placed on a special paper. The special paper is a paper with a printed pattern of dots. The integrated digital camera of the Anoto pen perceives the writing movements of the pen over the pattern of dots. The camera records a large number of images per second. Each recorded image is compared with the subsequent image, and an integrated processor uses them to calculate the direction change and the movement path of the pen refill, which is integrated in the pen, taking account of how the pen is held. A large number of dots are printed on the special Anoto paper, which are applied using carbon-based ink and are separated from one another by less than 1 mm. Each Anoto special paper has a different pattern of dots, so that the individual papers can be distinguished from one another. A light-emitting diode (LED) illuminates the ink dots, with contain carbon, absorb longwave infrared light, and can thus be identified by the integrated digital camera within the Anoto pen. The Anoto special paper allows the relative movement of the pen to be determined, as well as the absolute position of the pen on the paper.

The disadvantage of the Anoto pen is that special paper is required and the way in which the pen is held is predetermined. Furthermore, the confidence against falsification of the signature verification is too low, since no personal-specific biometric data is determined. The Anoto pen does not record the individual writing pressure on the tip of the pen refill.

In addition to electronic signature verification, there is an increasing need for electronic recording of handwritten texts and characters. In conventional methods for handwriting identification, hand-guided writing movements are recorded optically, and the written image data that is determined is then converted by means of OCR methods to ASCI coded data. A number of possible word candidates are conventionally selected during the process of identification of a written word. The number of possible word candidates in this case becomes greater the less clear the handwriting is, and the greater the number of similar words that exist. The most probable word candidate from the various possible word candidates is then determined and emitted, by means of statistical evaluation. The statistical evaluation is carried out, as in the case of automatic speech identification, by means of so-called word sequence statistic programs, which calculate the statistical probability of the occurrence of the respective word candidate on the basis of the previous words which have been identified. The most probable word candidate that occurs is selected, and is then emitted. The disadvantage of such conventional methods for handwriting identification is that the number of possible word candidates is in many cases very high, so that the identification rate is often very low.

Writing systems for signature verification, for personal identification or verification and for handwriting and speech identification have to have a very high degree of confidence against falsification, and have to have low error rates. Furthermore, the technical implementation must not be excessively complex, in order to allow a wide field of application.

The object of the present invention is thus to provide a multifunctional biometric acoustic writing system, which has low error rates and offers a very high degree of confidence against falsification, allows acceptance that is as wide as possible, and can be produced very cost-effectively.

According to the invention, this object is achieved by a biometric writing system having the features specified in Patent Claim 1.

The biometric writing system according to the invention is preferably used as a multifunctional input system for personal identification in biometry.

The writing system according to the invention can replace or add to the tablet of PC or a virtual desktop, using normal writing paper as the input medium. The writing system according to the invention can also be used in life sciences for diagnosis and therapy, in medicine and in psychology.

The invention relates to a biometric acoustic writing system having a pen housing for carrying out hand-guided movements on a substrate, at least one microphone, which is integrated in the pen housing, for acoustic recording of sound signals which are caused by the hand-guided movements; and a data processing unit for calculation of biometric data as a function of the recorded sound signals.

The biometric, acoustic writing system according to the invention allows the generation of personal-specific biometric reference data which is unique for that person. This makes it possible to verify the identity of someone who is writing, and even to identify them by comparison with stored reference data.

The biometric writing system according to the invention also allows handwriting identification and handwritten-sketch identification in order to determine and emit handwritten characters in digital form.

The biometric writing system according to the invention preferably includes a data processing unit for reconstruction of handwritten characters and texts from the recorded sound signals.

A pen is preferably provided in the pen housing, which has been placed on the substrate and is guided on the substrate.

This offers the particular advantage that the person has a natural sense of writing, since the biometric writing system according to the invention behaves like a normal pen appliance with a pen refill filled with ink.

The acoustic writing noise which is caused by the friction of the pen on the substrate during the hand-guided writing movement is preferably transmitted as a structure-borne sound signal via the pen and/or additionally as an airborne sound signal via the surrounding air, through the microphone which is integrated in the pen housing.

Since the writing noise can be transmitted not only via the surrounding air but also a structure-borne sound signal, the writing system according to the invention is also suitable for fields of application in acoustically loud areas.

The microphone is preferably mechanically coupled to the pen in order to transmit the structure-borne sound signal.

In this case, in one particular preferred embodiment, the microphone is mechanically coupled to a sound body, which is connected to the pen, in order to transmit the structure-borne sound signal.

The sound body is preferably in the form of a resonator for specific natural frequencies.

In one preferred embodiment of the biometric writing system according to the invention, the microphone is arranged in an air bearing sound chamber which is provided in the pen housing.

The air bearing sound chamber is preferably in the form of a resonator for specific natural frequencies.

Together with the resonators, the microphone is preferably surrounded by sound insulation, which is intended to attenuate environmental noise and passes sound signals only via the pen.

The air bearing sound chamber can be coupled to the surrounding air via a housing opening which is provided in the pen housing.

The housing opening can be closed by means of a mechanical closure device in order to suppress external noise.

This offers the user the capability to suppress interference noises from the environment by closing the opening.

When the housing opening is open, the microphone preferably acoustically records the internal and external writing noise which is caused by the hand-guided writing movement as a structure-borne and airborne sound signal and/or acoustically records a speech signal which originates from a person.

The sound body for the external writing noise is preferably formed by the writing substrate.

When the housing opening is open, the microphone can optionally be replaced by a second microphone, which is not acoustically isolated, in the pen housing.

The acoustic recording of the speech signal in addition to the acoustic recording of the writing noise allows the error rate for identification of that person to be considerably reduced. The combination of the evaluation of the speech signal and of the writing noise results in the biometric writing signal having a very high degree of identification confidence.

The microphone preferably converts the recorded acoustic sound signals to an electrical sound signal.

The electrical sound signal is preferably converted by an analogue/digital converter to sound signal data for digital data processing by means of the data processing unit.

In this case, the writing noise and the speech signal are recorded simultaneously or successively by means of the microphone.

The sound signal data which is produced can preferably be stored in a memory unit for the biometric writing system.

The writing substrate is preferably composed of any desired paper.

In this case, the writing substrate is preferably a fixed substrate which has a specific pronounced surface roughness and hardness.

In one particularly preferred embodiment of the biometric, acoustic writing system, a loudspeaker is provided in the pen housing in order to reproduce recorded microphone system, in order to reproduce stored biometric reference data, and in order to reproduce spoken information.

Preferably and in addition, a speech signal which originates from the person is recorded acoustically, and corresponding sound signal data is produced for speaker identification or speech identification.

The writing noise itself can likewise be evaluated using the algorithms and methods for speaker and speech identification.

In a further preferred embodiment of the biometric, acoustic writing system or acoustomechanical writing system according to the invention, a second sensor device is also provided, which records the writing dynamics via the static and dynamic pressure, and records the writing speed via the oscillation of the pen, of the hand-guided writing appliance which has been placed on the substrate.

In a further preferred embodiment of the biometric, acoustic writing system or acoustomechanical writing system according to the invention, at least three sensors are provided for simultaneous recording of the writing forces which occur and of oscillations of the pen refill in three spatial directions.

In a further preferred embodiment of the biometric, acoustic writing system or acoustomechanical writing system according to the invention, an inclination sensor device is also provided, which determines the inclination of the hand-guided writing appliance which has been placed on the substrate, and thus predominantly records the finger motor movements while writing.

In one preferred embodiment of the biometret writing system an optical sensor device is also provided, which records position data of the hand-guided pen movement via image signals from the surface of the writing substrate.

In a further preferred embodiment of the biometric writing system, a pressure sensor device is also provided, which records the static and dynamic pressure of the hand-guided pen which has been placed on the substrate.

The microphone is preferably an electric microphone, a piezoelectric microphone, a piecoresistive microphone or capacitive microphone.

An interchangeable pen refill is preferably provided in the pen of the biometric writing system.

This pen refill can preferably be extended from the pen by means of a switching device.

In one preferred embodiment of the biometric writing system according to the invention, the optical sensor device has imaging optics in order to image the substrate surface, and has a converter device for conversion of the optical imaging signal to an electrical signal.

The imaging optics are in this case preferably in the form of optical lenses and/or glass fibres.

The converter device is preferably a CCD camera or a photodiode array.

Furthermore, a diode light source is preferably provided in order to illuminate the substrate surface.

In one particularly preferred embodiment, a laser diode is also provided in order to illuminate the substrate surface and an optical grating which is integrated in the pen.

The optical sensor device preferably records the movements which are carried out by the pen by comparison of the image sequences, recorded with the time offset, of the substrate surface.

In one alternative embodiment, the optical sensor device records the movements which are carried out by the pen by comparison of the image sequences, which are recorded with the time offset, of the interference of the laser light which is reflected on the grating and on the substrate surface.

In one preferred embodiment, when it is in an extended state on the substrate, the pen refill emits a writing liquid while the hand-guided movements are being carried out, which writing liquid increases the structuring of the substrate surface, such that the optical recording of the hand-guided movements by means of the optical sensor device is simplified and a natural writing style is produced.

The data processing unit is preferably integrated in the pen housing or in an external receiving unit.

The external receiving unit is in this case preferably a computer, a microcontroller, a mobile telephone, a credit card reader, a fax machine or a printer.

The recorded sound signal data, optical movement data and recorded multidimensional pressure data is preferably transmitted via a data transmission path from the pen housing to a data processing unit which is integrated in an external receiving unit.

The biometric writing system according to the invention preferably has a scrambling unit, which is contained in the pen housing, for scrambling sound signal data, optical movement data and pressure data.

The data transmission path in this case preferably uses wires, or is wire-free.

The biometric writing system according to the invention preferably has a data memory for storage of biometric reference data, position data for the writing movement, and spoken information.

The biometric reference data is preferably calculated by the data processing unit from the sound signal data which is recorded while writing and speaking a word, from optical movement data, from mechanical pressure data and is stored in a reference data memory.

The reference data memory is preferably a microchip in an identification card or a credit card, is an authorization magnetic card, or is a memory unit for a computer or for the biometric writing system.

The written and spoken words and characters are preferably pin codes, passwords, names or texts.

The position data for the writing movement is preferably calculated from the sound data signals which are recorded while writing a word, from optical movement data and from mechanical pressure data, and is stored in the data memory for handwriting identification.

The reference data memory is in this case preferably integrated in the pen housing.

The data processing unit which is integrated in the external receiving unit is preferably connected to a reference data memory.

In one preferred embodiment of the biometric writing system, the external receiving unit has a reading unit for reading portable biometric reference data.

The external receiving unit is preferably connected to a reference data memory via a data network to a database.

The data network is preferably the Internet.

In one preferred embodiment of the biometric writing system, the data processing unit compares the calculated current biometric data with the stored biometric reference data for its verification and identification.

If the current biometric data largely matches the stored reference data, the data processing unit produces an identification and/or verification indication signal.

In one particularly preferred embodiment of the biometric writing system according to the invention, if the current biometric data completely matches the stored biometric reference data, the data processing unit identifies the current biometric data as a stolen copy of the stored reference data, and produces a corresponding warning signal.

The data processing unit produces a discrepancy indication signal in the event of a discrepancy between the current biometric data and the stored biometric reference data.

In one preferred embodiment of the biometric writing system, this writing system has at least one actuator which is operated after production of the identification and/or verification indicator signal.

The invention also provides a method for generation of personal-specific biometric reference data, having the following steps:

acoustic recording of hand-guided writing movements which are carried out by a person using a pen on a substrate while writing a character, a word or a word sequence, and production of corresponding sound signal data;

storage of the sound signal data that is produced, as a digital sound time signal;

calculation of associated frequency spectra as a spectrogram from the time-segmented sound signal data by means of a fast Fourier transformation;

determination of amplitude time signals of selected frequencies in order to record the amplitude dynamics in the calculated spectrogram;

calculation of an associated frequency spectrum from the selected amplitude time signals by means of fast Fourier transformation;

determination of first biometric data from the sound and oscillation intensity of the digital time signals by means of feature extraction;

determination of second biometric data from the calculated spectrogram of the time-segmented sound and oscillation time signals by means of feature extraction;

determination of third current biometric data by means of feature extraction from the calculated frequency spectrum of the amplitude time signals;

determination of fourth current biometric data by means of feature extraction from recorded dynamic writing pressure, oscillation and inclination data.

In one preferred embodiment of the method, the method steps are carried out more than once in order to generate personal-specific biometric reference data, and the respectively determined reference data is evaluated statistically, with the evaluated data being scrambled as personal-specific reference data, and then being stored.

In one preferred embodiment, the statistically evaluated, personal-specific reference data is stored in a microchip in an identification card, in a microchip in a credit card, in an authorization magnetic card or in a memory unit for a computer or for a writing system.

Preferably and additionally, a speech signal which originates from that person is acoustically recorded, and corresponding sound signal data is produced.

Furthermore, in one preferred embodiment of the method according to the invention, the writing forces which occur in at least one spatial direction while the writing movement of the pen is being carried out is recorded by means of pressure sensors in order to generate personal-specific biometric reference data, and at least one-dimensional writing pressure data is produced in a corresponding manner.

Furthermore, the writing movements which are hand-guided on the substrate while writing a character, a word or a character/word sequence with the pen are preferably recorded optically, and corresponding writing movement data is produced.

The biometric reference data is preferably determined from the sound intensity of the digital time sound signal by means of feature extraction, from the calculated frequency spectrum of the sound time signal by means of feature extraction, and from the optical movement data and writing pressure data produced while writing and speaking a word, and is stored in the reference data memory in a scrambled form as personal-specific biometric reference data.

Data reduction of the static and dynamic writing movement data, of the writing pressure data, of the optical movement data and of the sound signal data is preferably carried out by means of cluster formation.

Feature parameters are preferably extracted from the data-reduced cluster data.

The generated biometric reference data is preferably stored inside or outside the pen.

The invention furthermore provides a method for verification of a person having the following steps:

acoustic recording of hand-guided writing movements which are carried out by a person using a pen on a substrate while writing a character, a word or a word sequence, and production of corresponding sound signal data;

production of writing pressure signal data for the writing pressure and production of oscillation signal data for oscillations which are transmitted from the pen to at least one pressure and oscillation sensor;

storage of the signal data that is produced at digital time signals;

calculation of frequency spectra as a spectrogram from the stored time-segmented sound and oscillation time signals by means of fast Fourier transformation;

determination of amplitude time signals of selected frequencies in order to record the amplitude dynamics in the spectrogram of the sound and oscillation time signals; calculation of an associated frequency spectrum from the selected amplitude time signals by means of a fast Fourier transformation.

In this case, a speech signal which originates from the person is preferably additionally acoustically recorded, and corresponding sound signal data is produced.

In this case, preferably and additionally, a speech signal which originates from the person is acoustically recorded, and corresponding sound signal data is produced.

A speech signal which originates from the person is preferably additionally acoustically recorded, and corresponding sound signal data is produced.

The writing movements which are hand-guided on the substrate while writing or sketching a character, a word or a character/word sequence with the pen are preferably additionally optically recorded, and corresponding position data is produced.

Preferably and additionally, the forces which occur in at least one spatial direction while the writing movement of the pen is being carried out are recorded by pressure sensors, and correspondingly, at least one-dimensional, writing pressure data is produced.

In one preferred embodiment of the method according to the invention, the character, the word or the word sequence is determined from the sequence of selected reference feature vectors, from the position data and from the writing pressure data by means of statistical, connectionistic and knowledge-based methods.

In one particularly preferred embodiment of the method according to the invention, the determined character is fed back optically and/or acoustically to the person producing it, in order to check it.

The generated personal-specific reference data is preferably evaluated in order to determine psychological and/or physiological features of the person.

The biometric writing system according to the invention can be used widely.

In one preferred embodiment, the biometric writing system is used as a computer input device.

In an alternative application, the writing system according to the invention is used as a speech input device, in particular as a dictation machine.

The biometric writing system according to the invention is preferably used for identification of motor-neurone movement disturbances of a person.

The biometric writing system according to the invention is furthermore preferably used as a therapy system for treating motor-neurone movement disturbances of person.

The biometric writing system according to the invention is furthermore and preferably used as a graphological system for determination of psychological/physiological features of a person.

The biometric writing system according to the invention is preferably used as a training system for learning to write.

The biometric writing system according to the invention is preferably used as a training system for learning a language.

Furthermore, preferred embodiments of the biometric writing system according to the invention and of the method according to the invention for personal identification, or personal verification, for generation of biometric reference data and for handwriting and handwritten-sketch identification will be described with reference to the attached figures in order to explain features which are significant to the invention.

In the figures:

FIG. 3a-3e show a section view through pen housings according to preferred embodiments of the biometric writing system according to the invention;

FIG. 6 shows acoustically recorded writing noise for a different writing speed on cardboard and on writing paper;

FIG. 8 shows an acoustically recorded sound time signal when writing the letter "b" three times;

FIG. 9 shows frequency signals when writing the letter "a" and "b" in the form of a time profile;

Figure 1:
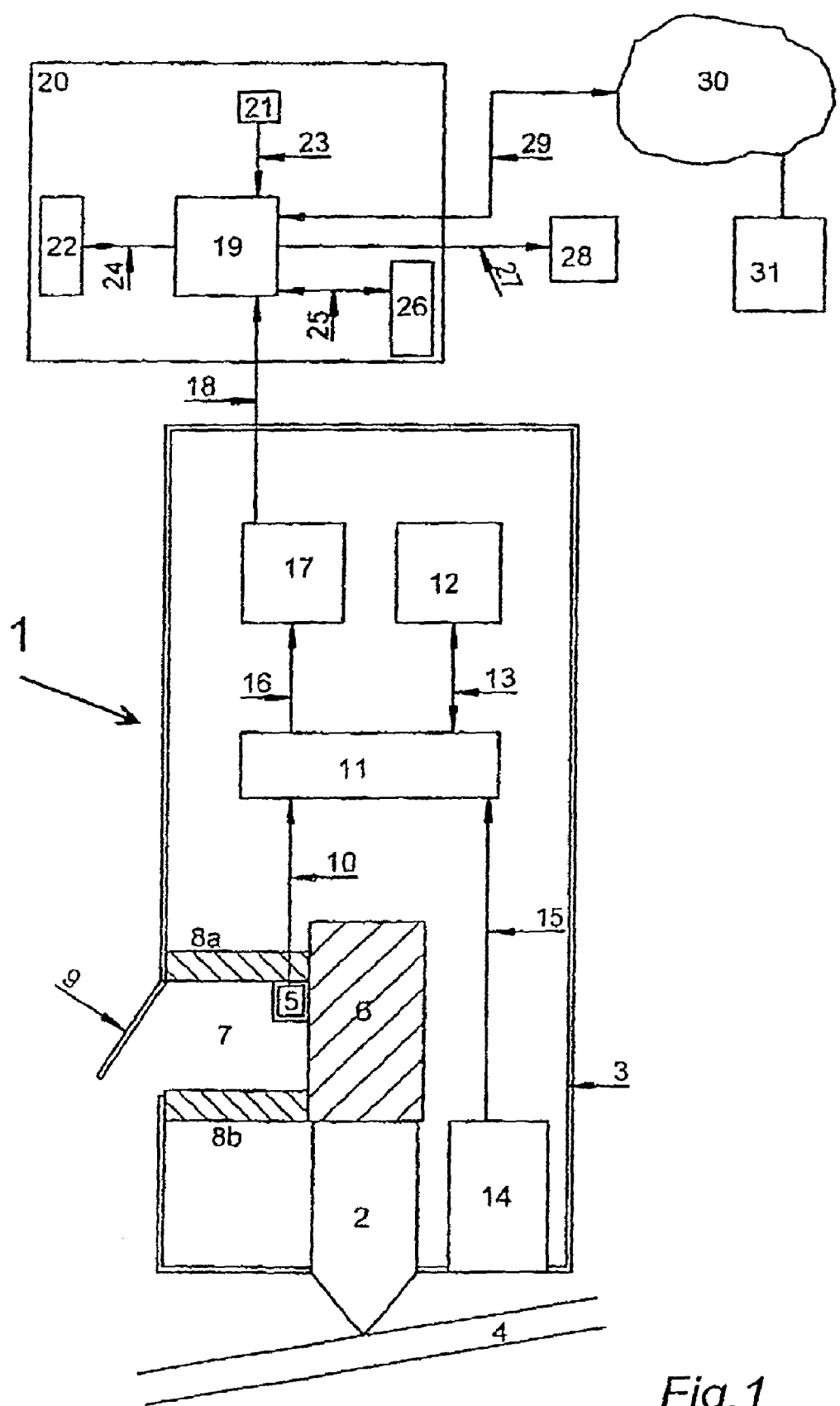
FIG. 1 shows a schematic figure in order to illustrate one preferred embodiment of the biometric writing system according to the invention.

FIG. 1 shows a schematic block diagram of the biometric writing system 1 according to the invention. The biometric writing system 1 according to the invention has a pen 2 which is integrated in a pen housing 3. The pen 2 is used to carry out hand-guided movements on a substrate 4. The substrate 4 may be any desired substrate with any desired surface. The substrate 4 is preferably paper. The writing substrate 4 is preferably a fixed substrate, which has a specific pronounced surface roughness and hardness.

The pen 2 preferably contains an interchangeable pen refill, which can be extended from the pen 2 by means of a mechanical switching device, which is not illustrated. The pen housing 3 is used to carry out hand-guided movements on the substrate 4. In this case, in order to give the pen 2 and its pen refill a normal writing feeling, a writing liquid is emitted onto the substrate 4 in order to provide visual feedback for the writer. When the pen 2 is placed on the substrate and it is moved on the surface, writing noises are produced. At least one microphone 5 for acoustically recording of sound signals is provided in the pen housing 3 in the writing system 1 according to the invention. The microphone 5 records the sound signals which are produced by the hand-guided movements, that is to say the writing noise which is produced by the writing movement. The acoustic writing noises which are produced by the friction of the pen 2 on the substrate 4 during the hand-guided writing movement are transmitted on the one hand as a structure-borne sound signal via the pen 2 and on the other hand as an airborne sound signal via the surrounding air to the microphone 5. In this case, the microphone 5 is mechanically coupled to the pen 2, in order to transmit the structure-borne sound signal. In the preferred embodiment shown in FIG. 1, the microphone 5 is mechanically coupled to a sound body 6, which is connected to the pen 2, in order to transmit the structure-borne sound signal. The sound body 6 is preferably in the form of a resonator for specific natural frequencies.

As is illustrated in FIG. 1, the microphone 5 is located in an air bearing sound chamber 7 which is provided in the pen housing 3. The air bearing sound chamber 7 is preferably in the form of a resonator for specific natural frequencies. The microphone 5 is surrounded by sound insulation 8a, 8b, which is provided in order to attenuate surrounding noises and passes only sound signals from the sound body 6 and the air bearing sound chamber 7. The air bearing sound chamber 7 can be coupled to the surrounding air via a housing opening which is provided in the pen housing 3. In this case, the housing opening can preferably be closed by means of a mechanical closure device 9, in order to suppress external noises. When the housing opening is open, the microphone 5 records the internal and external writing noise which is caused by the hand-guided writing movement, as a structure-borne and airborne sound signal, as well as a speech signal which originates from a person. The microphone 5 converts the recorded acoustic sound signals to an electrical sound signal. The electrical sound signal is converted by an analogue/digital converter to sound signal data for digital data processing. The digital signal data is supplied via a signal line 10 to a data processing unit 11 for further digital processing. The writing noise which is produced by writing and the speech signal which may additionally be received from the person are recorded either simultaneously or successively by the microphone 5, and are converted to corresponding sound signal data. The sound signal data which is supplied to the data processing unit 11 is preferably stored in a memory device 12 which is provided for this purpose and is connected to the data processing unit 11 via lines 13.

In addition to the microphone 5 as an acoustic sound sensor, the biometric writing system 1 according to the invention and as illustrated in FIG. 1 preferably additionally has an optical sensor device 14, which records position data of the hand-guided pen movement via image signals from the surface of the writing substrate 4. The optical sensor device is likewise connected to the data processing unit 11 via a signal line 15.

The microphone 5 may, for example, be an electret microphone, a piezoelectric microphone, a piezoresistive microphone or a capacitive microphone. The optical sensor device 14 preferably contains imaging optics for imaging the substrate surface, and a converter device for conversion of the optical imaging signal to an electrical signal. The electrical signal is converted by an analogue/digital converter to position data or movement data, and is emitted via the signal lines 15 to the data processing unit 11. The imaging optics of the optical sensor device 14 are preferably in the form of optical lenses and/or glass fibres. The converter device may be a CCD camera or a photodiode array. A diode light source is preferably additionally provided, in order to illuminate the substrate surface. Furthermore, a laser diode is provided in order to illuminate an optical grating is integrated in the pen. The optical sensor device 14 records the movements carried out by the pen 2 by comparison of the image sequences, which are recorded in the time offset and show the surface of the substrate. As an alternative to this, the optical sensor device 14 may also be designed in such a way that it records the movements which are carried out by the pen 2 by comparisons of the image sequences, which are recorded with the time offsets, of the interference of the laser light which is reflected on the grating and on the substrate surface.

When in the extended state onto the substrate 4, the pen refill emits a writing liquid while the hand-guided movements are being carried out, which writing liquid increases the structuring of the surface so that optical recording of the hand-guided movements by means of the optical sensor device 14 is made easier.

Furthermore, the ink written image on the substrate provides the writer with a natural writing style.

The data processing unit 11 is, as is illustrated in FIG. 1, integrated in the pen housing 3. In an alternative embodiment, the data processing unit may also be integrated in an external receiving unit. Examples of a receiving unit such as this may include a computer, a microcontroller, a portable telephone, a credit card reader, a fax machine or a printer.

The sound signal data which is recorded by the microphone 5 and the movement data which is recorded by the optical sensor device 14 are transmitted, if the data processing unit is located externally in a local computer, via a data transmission path 18 from the pen housing 3 to this local computer 20. As can be seen from FIG. 1, the data processing unit 11 is connected via a signal line 16 to a downstream scrambling unit 17. The scrambling unit 17 is used for scrambling the sound signal data, which is emitted in the data processing unit 11 within the pen housing 1, and the recorded optical movement data. Scrambled data is transmitted via the data transmission path 18, which uses wires or is wire-free, to a data processing unit 19 within the local computer 20. In addition to the data processing unit 19, the local computer 20 has a memory 21 and a display 22, which are connected via respective signal lines 23, 24 to the data processing unit 19. The data processing unit 19 and the local computer 20 is also connected via lines 25 to a reader unit 26. Furthermore, the data processing unit 19 in the local computer 20 controls an actuator 28, for example a safety or security door, via control lines 27. The data processing unit 19 is connected via a line 29 to a data network 30, to which an external database 31 is connected. The data network 30 is preferably the Internet.

The biometric writing system 1 which is illustrated in FIG. 1 contains an acoustic sensor device 5 and an optical sensor device 14. In one preferred embodiment, the biometric writing system 1 according to the invention additionally has a pressure sensor device, which records the static and dynamic pressure of the hand-guided pen which has been placed on the substrate 4, and emits corresponding writing pressure data to the data processing unit 11. The recorded sound signal data, the optical movement data and the recorded multidimensional pressure data are transmitted from the data processing unit 11, after appropriate scrambling by the scrambling unit 17, via the data transmission path 18 from the pen housing 3 to the data processing unit 19 which is integrated in the local computer 20. The data processing unit, which is located inside or outside the pen housing 3, uses the recorded sound signal data, the optical movement data and the mechanical writing pressure data to calculate biometric reference data, which is stored in a reference data memory, for example in the memory 12 or in the memory 21. In alternative embodiments, the reference data memory may be a memory inside an identification card or a credit card, or an authorization magnetic card or a memory unit for any desired computer. The written words and characters whose writing noises are recorded acoustically by the microphone 5 and are emitted as sound signal data are, in particular, written pin codes, passwords, names or handwritten texts. The characters which are written by the person may at the same time be spoken by the person and may likewise be recorded by the microphone 5, as a speech signal.

The reading unit 26 which is provided in the local computer 20 is used, for example, for reading a portable memory medium for biometric reference data. Calculated, current biometric data can be compared in the data processing unit 31 with stored biometric reference data, for verification and identification. If the current biometric data largely matches the stored reference data, the data processing unit 11 or 19 produces an identification and/or verification indication signal. In this case, once the identification and/or verification indication signal has been produced, an actuator, for example a security or safety door, is operated on the data processing unit 19.

If the data processing unit 11 or 19 finds that the current biometric data completely matches the stored biometric reference data, the current biometric reference data is identified by the data processing units 11, 19 as being a stolen copy of the stored reference data, and an appropriate warning signal is produced.

The stored personal-specific biometric reference data is first of all generated by the biometric writing system 1 according to the invention, for subsequent comparison. The personal-specific biometric reference data is generated as follows. First of all, the hand-guided writing movements which are carried out by the pen 2 on the substrate while a person is writing a character, a word or a word sequence are recorded acoustically, that is to say the writing noise is recorded acoustically by the microphone 5. After analogue/digital conversion, the microphone 5 generates sound signal data, which is emitted to the data processing unit 11. The sound signal data is stored as a digital sound time signal, and an associated frequency spectrum is calculated from this stored time signal, by means of Fourier transformation. First biometric reference data is determined from the sound intensity of the stored digital sound times signal, by means of feature extraction. Second biometric reference data is determined from the calculated frequency spectrum of the sound time signal by means of feature extraction. These method steps are preferably carried out more than once, and the respectively determined reference data is evaluated statistically, with the evaluated data being stored in a scrambled form of personal-specific reference data. The statistically evaluated, personal-specific reference data is preferably stored in a microchip in an identification card, a microchip in a credit card, in an authorization magnetic card or in a memory unit for a computer or writing system. In addition to the writing noise, the microphone 5 can additionally acoustically record a speech signal which originates from the person, and can emit corresponding sound signal data to the data processing unit 11. Preferably and additionally, the optical sensor device 14 optically records the hand-guided writing movements and produces corresponding writing movement data, which are emitted to the data processing unit 11. Furthermore and preferably, the writing forces which occur while the writing movement is being carried out by the pen 2 are recorded via pressure sensors which are not illustrated, and at least one-dimensional writing pressure data is emitted in a corresponding form to the data processing unit 11. The data processing unit 11 determines the biometric reference data from the sound intensity of the digital time sound signal by means of feature extraction, from the calculated frequency spectrum of the sound time signal by means of feature extraction, and from the optical movement data and writing pressure data which are produced while writing and speaking a word, by means of feature extraction. Data reduction of the static and dynamic writing movement data, of the writing pressure data, of the optical movement data and of the sound signal data is then preferably carried out by means of cluster formation. Feature parameters are then extracted from the data-reduced cluster data.

Figure 2:
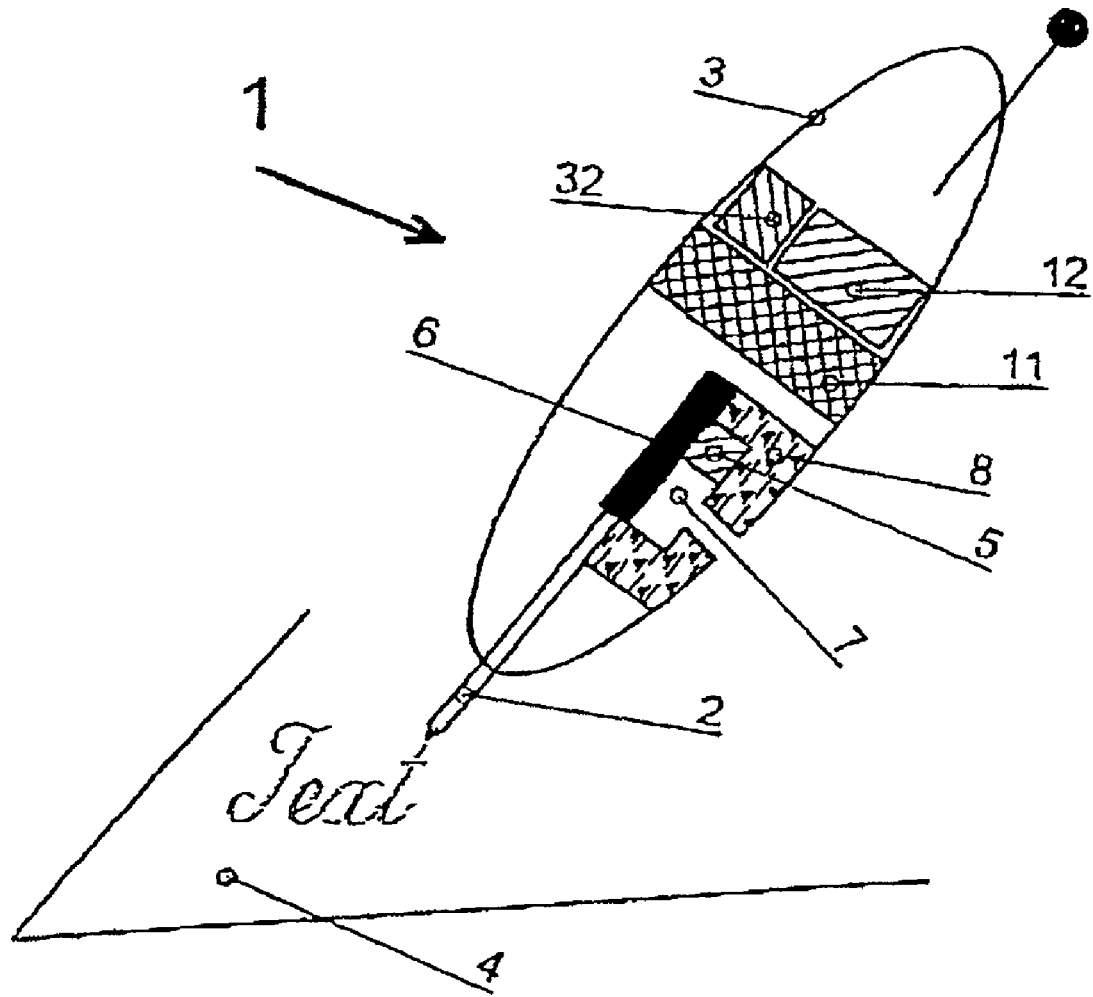
FIG. 2 shows a section view through a pen housing of the biometric writing system according to the invention.

FIG. 2 shows one preferred embodiment of a writing pen 2 for the biometric writing system 1 according to the invention. The pen housing 3 which is illustrated in FIG. 2 is, for example, a conventional ball-point pen housing. The pen housing 3 contains a pen 2 with an integrated pen refill. The pen 2 is mechanically connected to a sound body 6 for transmission of structure-borne sound signals. The microphone 5 detects the writing noise via the pen 2 and the sound body 6. In an alternative embodiment, the pen 2 may itself be used as a sound body. In addition to the writing noise, the microphone 5 can acoustically record a speech signal which originates from the person, when the airborne sound chamber 7 or the acoustic window is connected to the surrounding area by opening a closure device. The microphone 5 can record the writing noise and the speech signal simultaneously or successively. In the preferred embodiment illustrated in FIG. 2, the microphone 5 is an electret microphone. In the embodiment illustrated in FIG. 2, a loudspeaker 32 is additionally provided in the pen housing 3. The loudspeaker 32 is used to reproduce recorded microphone signals and, furthermore, the loudspeaker 32 can be used to reproduce stored biometric reference data and to reproduce spoken information. The loudspeaker 32 is preferably a miniaturized commercially available loudspeaker.

An acoustic writing signal or a writing noise is produced during writing with or movement of the pen 2 on the substrate 4. The pen 2 may be in the form of a ball-point pen refill, an ink knib or a wad with a defined tip. The substrate 4 is composed, for example, of paper or of a surface with a natural or additionally pronounced surface roughness and hardness. The surface roughness of the substrate 4 leads, while writing with the pen 2, to statistically stimulated, forced oscillations of the substrate and of the pen, that is to say statistical writing scratching noises and scrapping noises are produced from this. Depending on the design of the writing appliance and of the substrates, airborne sound loads and/or structure-borne sound loads are produced, from this and are transmitted to the microphone 5 within the pen housing 3. The pen 2 together with the housing 3 in the form of a sound body, as well as the air bearing sound chamber 7 in the pen housing 3, can be designed optimally on the basis of acoustic laws. The sound body 6 and the air bearing sound area 7 are preferably defined as resonators at specific frequencies. In this case, frequencies are preferably used which have the greatest dynamic range in terms of amplitude changes while writing.

While writing with the pen 2, the microphone 5 emits a sound time signal which is significantly above the noise level and whose sound intensity depends on the writing speed, while a very small proportion of it is dependent on the different roughness of the writing substrate and on the different mean contact pressure of the pen refill 2. Sound intensity of the recorded sound time signal increases with the writing speed. If the writing speed is the same, the intensity differences between different writing paper surfaces are negligible. The frequency spectrum of the recorded time signal comprises a continuous noise spectrum, with significant characteristic frequency lines superimposed on it. The frequency lines occur mainly at frequencies below 2 kHz. The amplitudes of these frequency lines increase significantly with the writing speed, at the same frequency. The amplitudes of the frequency lines increase to a minor extent as the surface roughness of the writing substrate 4 increases. In this case, the frequencies remain unchanged. For the same writing speed, the amplitudes are virtually independent of the writing substrate 4 that is used. The microphone 5, which attenuates airborne sound, is insensitive to sound events in the surrounding area. If the pen housing 3 is completely closed, the airborne sound chamber 7 has no connection to the surrounding air. If the air bearing sound chamber 7 is closed, environmental noises, in particular spoken words or motor noises, have no influence on the recorded sound time signal while writing. In this case, the microphone 5 recorded only the structure-borne sound that is produced via the pen refill.

The biometric features of the person's writing dynamics are detected from the changeover time in the acoustic microphone signals and/or the amplitudes of selected spectral lines. Since only the dynamics of the recorded sound signals are evaluated for the generation of biometric reference data, the influence of different roughnesses of the substrate 4 and the influence of manufacturing scatters in the production of the writing appliance are negligible. Scatters in the writing dynamics are thus a function of the person, and are specific to that person, and can thus be evaluated for identification and verification of that person. The sound time signal which is recorded acoustically by the microphone 5 is, in contrast to writing pressure signals which reflect the pressure of the pen refill in different directions, independent of how the pen 2 is held on the substrate 4. The sound signal which is produced by the microphone 5 does not change if the pen housing 3 is held such that it is rotated differently about the longitudinal axis. The geometry, the material, the layer structure, the attenuation and the acoustic coupling between the sound source and the microphone 5 of the writing appliance as illustrated in FIG. 2 can in this case be designed so as to allow the generation of optimum biometric features, which acoustically cause little disturbance for authentication methods. An acoustic window or an opening, which the person can close by pushing a button in order to record speech, is provided in the pen housing 3. A relatively small opening in the pen housing 3 is sufficient for this purpose, in order to also record the airborne sound via the microphone 5, while speaking. The person closes the housing window in order to record the pure acoustic writing signal or writing noise.

Figure 3A:
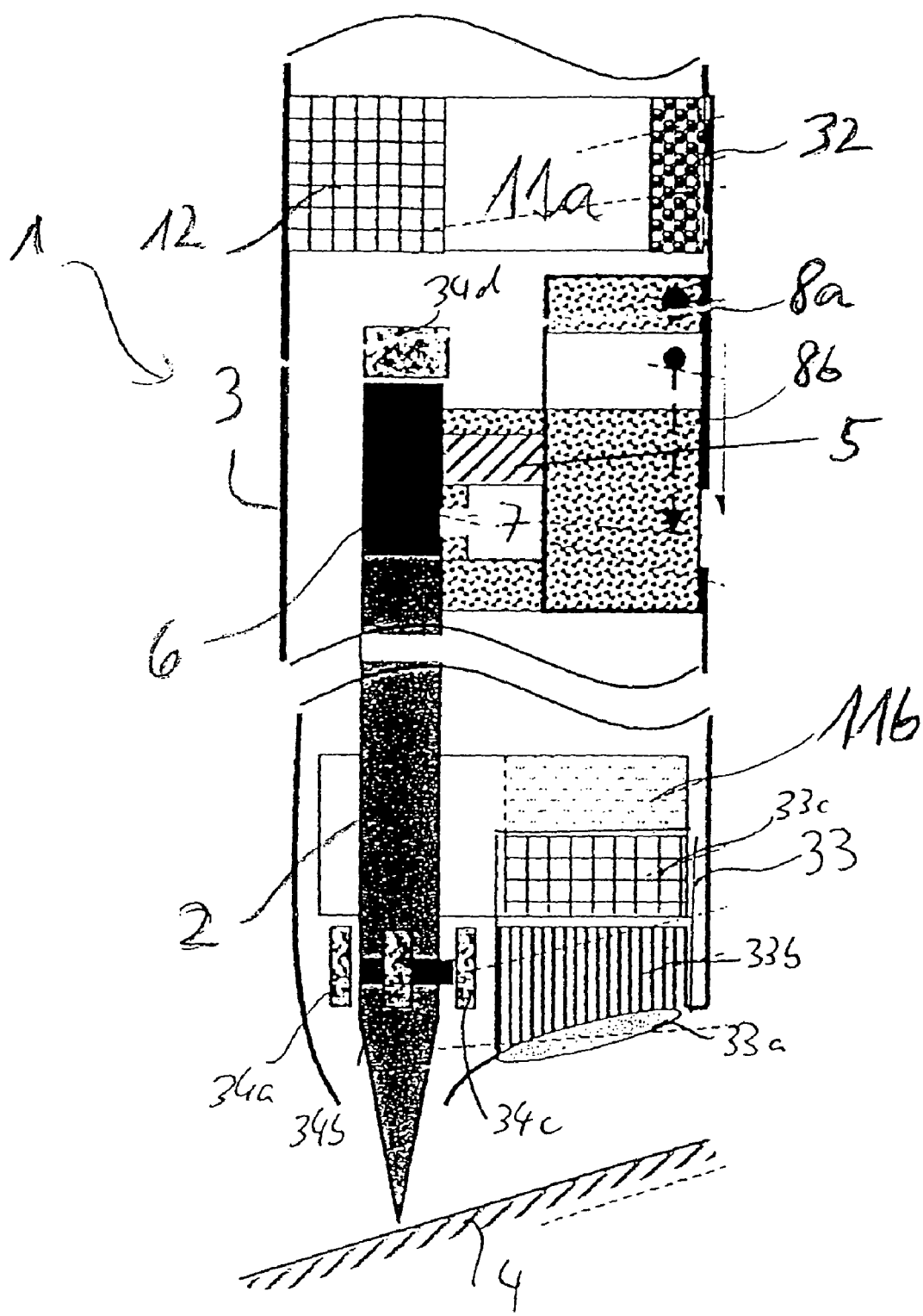
Figure 36:
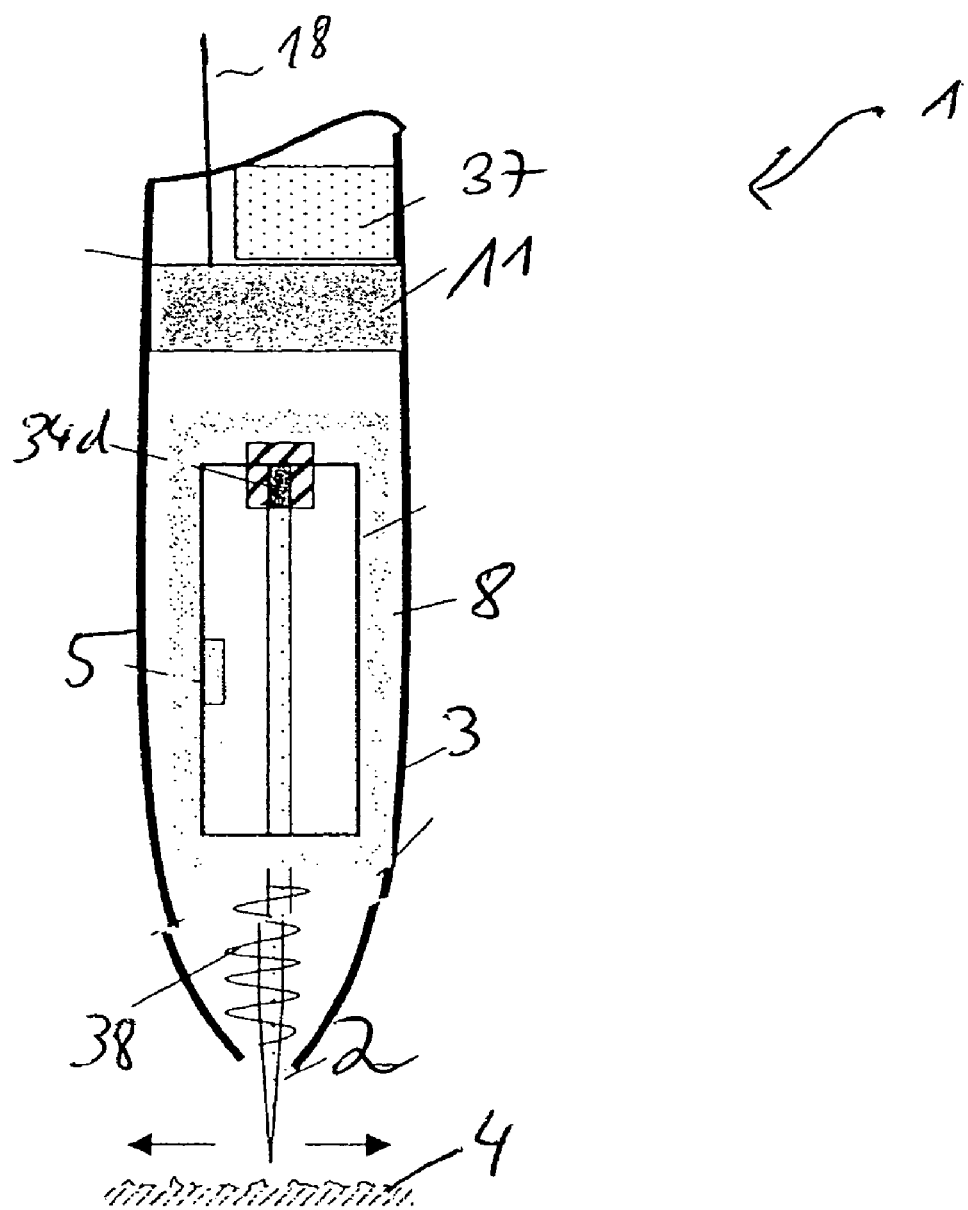

FIG. 3a shows a further preferred embodiment of the biometric acoustic writing system 1 according to the invention. In the particularly preferred embodiment that is illustrated in FIG. 3a, further sensor devices are additionally provided in the pen housing 3a, in addition to the microphone 5 for acoustic recording of writing noises. In addition, the biometric pen which is illustrated in FIG. 3 contains an optical sensor device 33. The optical sensor device 33 records the position data of the hand-guided pen movement via image signals from the surface of the writing substrate 4. The optical sensor device 33 contains imaging optics for imaging of the substrate surface, and a converter device for conversion of the optical imaging signal to an electrical signal.

The imaging optics are in the form of an optical lens 33a. The lens optics may be a glass-fibre bundle or a GRIN lenses. The converter device 33c of the optical sensor device 33 is, for example, a CCD camera with an integrated microprocessor. Alternatively, a photodiode array may be used. A diode light source is preferably additionally provided in order to illuminate the substrate surface. In one alternative embodiment, the laser diode is additionally used to illuminate an optical grating which is integrated in the pen.

The optical sensor device 33 records the movements which are carried out by the pen 2, by comparison of the image sequences, which are recorded with the time offset, of the substrate surface. In one alternative embodiment, the optical sensor device records the movements which are carried out by the pen 2 by comparison of the image sequences, which are recorded with the time offset, of the interference of the laser light which is reflected on the grating and on the substrate surface. In the extended state on the substrate 4, the pen refill 2 emits a writing liquid while carrying out the hand-guided movements, which increases the structuring of the substrate surface. This makes it easier to optically record the hand-guided movement by means of the optical sensor device 33, and the ink script provides the person with feedback, this making it easier to write naturally.

The first preferred embodiment of the biometric writing system 1 according to the invention, as illustrated in FIG. 3a, also contains a pressure sensor system 34 for recording the writing pressure, as well, in addition to the microphone 5 for recording the acoustic writing noise, and the optical sensor device 33 for generation of position and movement data. The pressure sensor system 34 is, for example, in the form of strain gauges DMS or force-resistive resistances FSR, as well as piezo sensors 34a, 34b, 34c, 34d, whose sensors record the static and dynamic pressure of the hand-guided pen 2 which has been placed on the substrate 4. The sound signal data which is emitted by the microphone 5, the movement data which is emitted by the optical sensor device 33 and the recorded multi-dimensional writing pressure data are supplied to an integrated data processing units 11a, 11b within the pen housing 3, and are processed to form biometric data. The biometric data that is determined is preferably temporarily stored in a data memory 12 within the pen housing 3. The currently determined biometric data is then preferably scrambled by means of a scrambling unit 17, and is transmitted via a data transmission path 18 to a remote computer 20.

In the embodiment illustrated in FIG. 3a, the acoustic window 7 can be switched between voice recording and writing noise recording by moving sound insulation 8b within the pen housing 3. For example, in a loud environment, the interfering external noise can be suppressed by closing the acoustic window 7. In order to increase the identification confidence, the person can open the acoustic window and, for example, can additionally speak a written password at the same time, or with a time offset.

FIG. 3b shows a second preferred embodiment of the biometric writing system 1 according to the invention. The data processing unit 11 is supplied with electrical power from a rechargeable battery 37. A pressure sensor device 34b is provided at the upper end of the pen refill 2. Furthermore, a knib 38 is provided. The pressure sensor 35b is preferably a piezo pressure sensor.

Figure 3C:
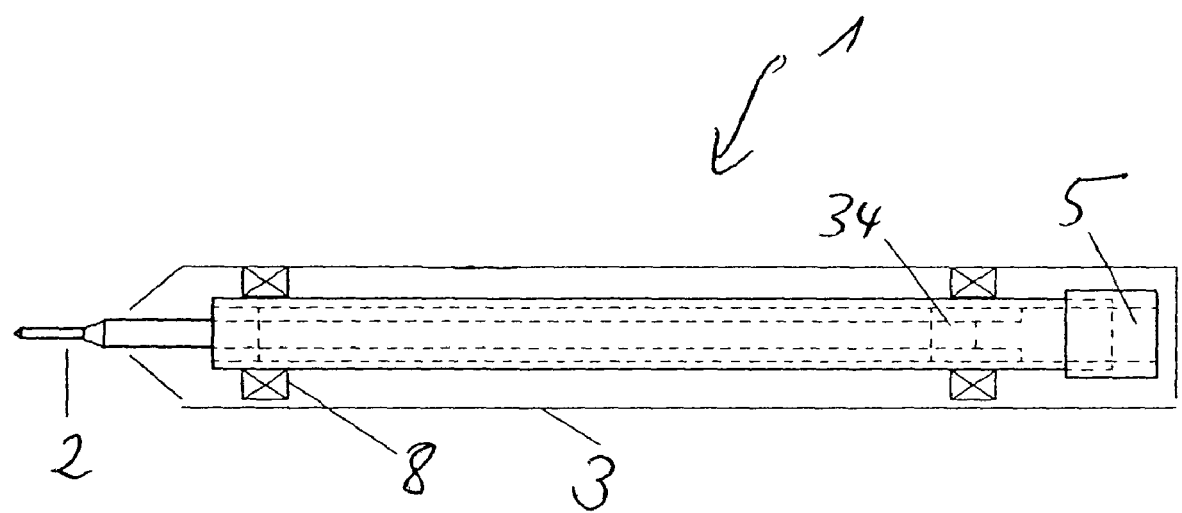

FIG. 3c shows a third preferred embodiment of the writing system 1 according to the invention. The writing system 1 is rotationally symmetrical and comprises a pen refill 2, a microphone 5 with a holder, sound insulation 8 and a piezo pressure sensor 34.

Figure 3D:
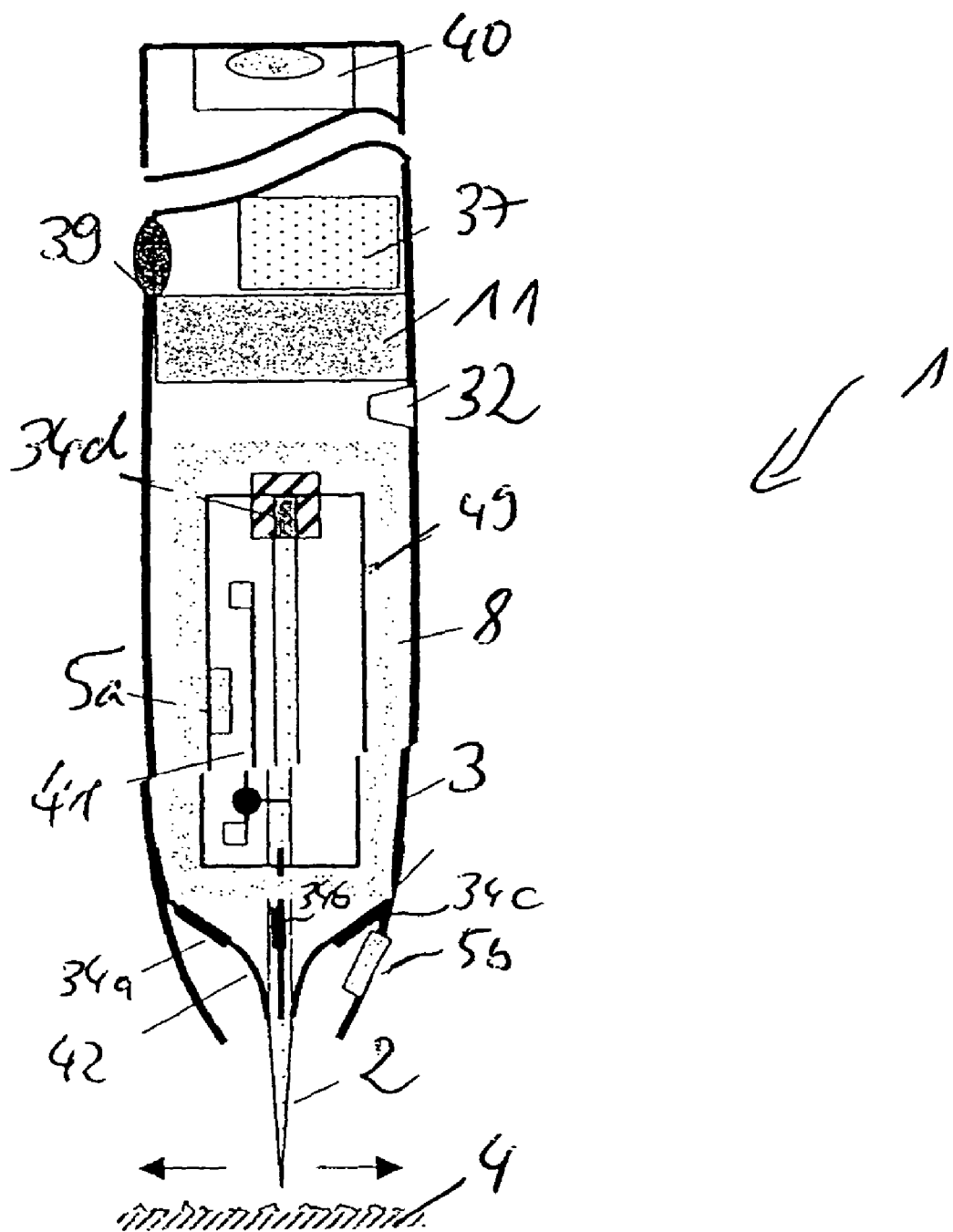

FIG. 3d shows a fourth preferred embodiment of the writing system 1 according to the invention. A fingerprint sensor 39 is provided on the pen housing 3. The fingerprint sensor 39 records biometric data relating to the person who is writing, via body features. The fingerprint sensor is preferably a capacitive fingerprint sensor. The pen 2 is mounted in the pen housing 3 by means of a spring steel folder 42. The pen 2 has two microphones 5a, 5b. A thinner microphone 5a is provided within a body 49 (which is provided in the pen housing 3) and is located in the vicinity of a face 41. The face 41 is used as an acoustic oscillator, and is connected to the pen refill 2. An external microphone 5b is used to record the environmental sound. The embodiment of the writing system 1 illustrated in FIG. 3d also has an inclination sensor 40. The inclination sensor 40 records the inclination of the pen 2 during writing, thus recording the motor movement of the finger which is guiding the pen. The data processing unit 11 is supplied with electrical power from a rechargeable battery 37. A pressure sensor 34b is also located at the upper end of the pen 2. Further pressure sensors 34a, 34b, 34c are provided on the spring steel holder 42. The spring steel holder 42 is used as a pen refill holder and as a deformation device for the strain gauges 34a, 34b, 34c, which are preferably fitted to the spring steel holder 42.

Figure 3E:
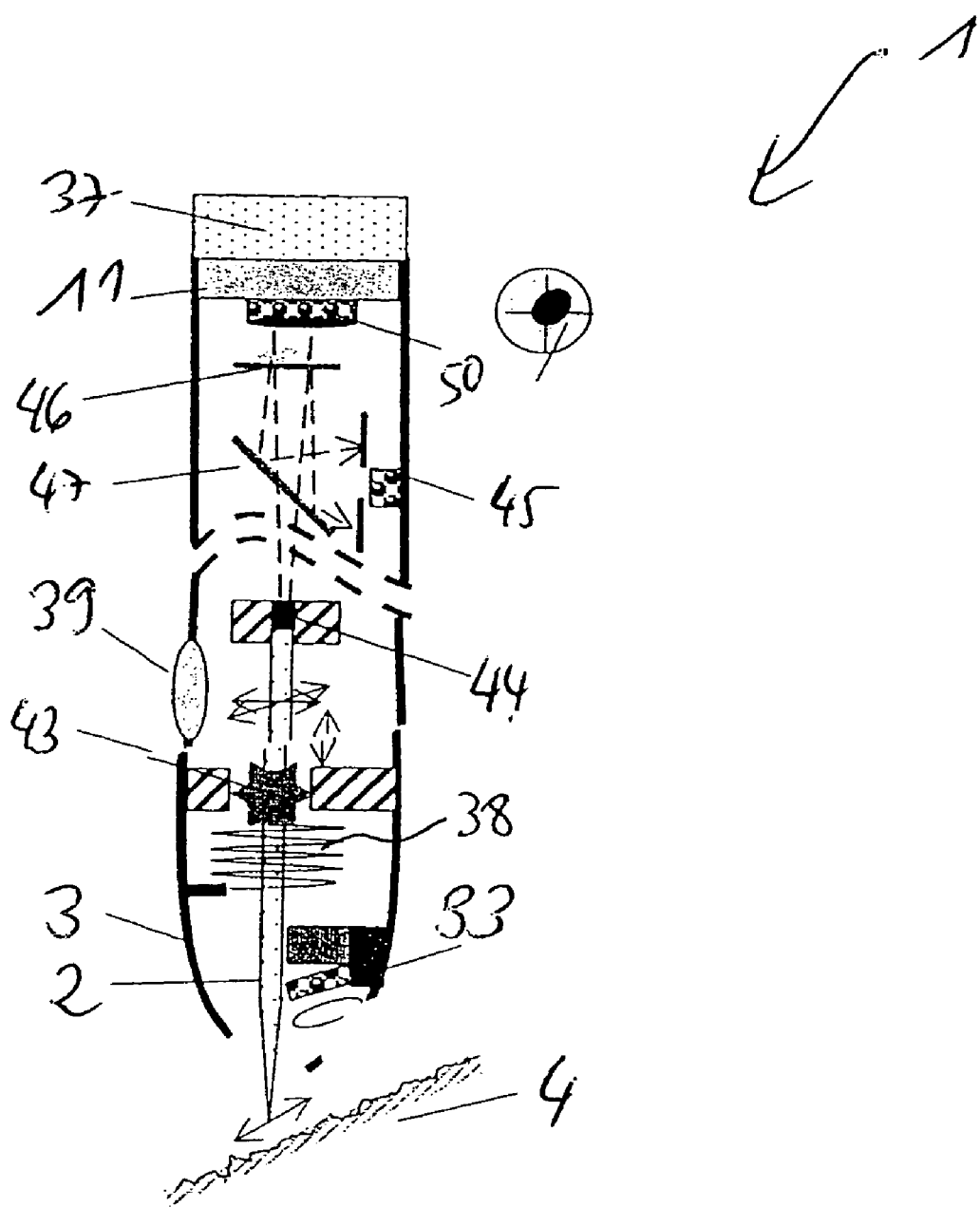

FIG. 3e shows a fifth preferred embodiment of the biometric writing system 1 according to the invention. The writing system 1 has an optical sensor device 48, which records the static and dynamic pressure and the oscillation of the hand-guided pen 2, which has been placed on the substrate 4, in three special directions at the same time. This optical sensor device 48 contains photodetectors for recording the movement of a diode light source 44. The diode light source 44 is firmly connected to the pen 2. The diode light source 44 carries out the deflection and oscillation of the pen 2, with the light beams which are emitted from the diode light source 44 being emitted as a light source system to the photodetectors of the optical sensor device 40. The light beams which are emitted from the diode light source 44 pass to a beam splitter 47, and from there to a lens 46, which preferably has a partially reflective lower face. The optical sensor device 40 furthermore contains a four-quadrant photodetector 50 as well as a single photodetector 45. The four-quadrant photodetector 50 is fitted behind the lens 46. The four-quadrant photodetector 50 records the deflection and the oscillation of the light source 44 in mutually orthogonal X, Y directions. The single photodetector 45 detects the deflection and oscillation of the light source 44 in the direction Z, which is at right angles to the X and Y directions. The dynamics of the writing pressure can be determined via the deflection, and the dynamics of the writing speed can be determined by the oscillation, in three special directions from the signals from the four-quadrant photodetector 50 and from the single photodetector 45. The signals from the photodetectors 45, 50 are supplied to the data processing unit 11, where they are evaluated. In the embodiment illustrated in FIG. 3d, the pen 2 is held by means of a pen refill holder 43. Furthermore, a knib 38 is provided. The image of the optical sensor device 40 comprises the beam splitter 47, the optically partially reflective lens 46 and the shutter.

The biometric acoustic writing system 1 illustrated in FIGS. 1 to 3 can be used in a versatile manner. The biometric writing system 1 can be used as a computer input device. Furthermore, the biometric writing system 1 is suitable for use as a speech input device, in particular as a dictation machine.

A further application possibility is identification and verification of a person who is writing by comparison of currently obtained biometric data with stored personal biometric reference data. When a person is being verified, a check is carried out in the process to determine whether, for example, the signature given actually originates from the correct person. For this purpose, the currently generated biometric data is compared with stored reference data for this person. One precondition for this is that the person-specific biometric reference data for this person must first of all be generated. For this purpose, hand-guided writing movements which are carried out by this person under supervision are first of all recorded acoustically. The person carrying this out signs, with his signature, for example, under supervision, and the microphone 5 within the writing appliance records sound signals of the writing noise that occurs during this process. The recorded writing noises are emitted as sound signal data to the data processing unit 11. The sound signal data is temporarily stored, as digital sound time signals, in a memory 12. The data processing unit 11 then calculates the associated frequency spectrum, for example by means of Fourier transformation. First biometric reference data is determined from the stored digital sound time signal, by means of feature extraction. Second biometric reference data is determined from the calculated and stored frequency spectrum of the sound time signal, likewise by means of feature extraction. These method steps can preferably also be carried out more than once, and the respectively determined biometric reference data is evaluated statistically. The evaluated data is then scrambled and stored as personal-specific reference data. The biometric reference data which is generated can then be used for personal verification and personal identification in a large number of applications. The personal-specific reference data which is generated is, for example, stored in a microchip in an identification card, in a microchip in a credit card, in an authorization magnetic card or in any desired memory unit for a computer. During the generation of the biometric reference data, a speech signal which originates from the person is preferably additionally recorded acoustically, and corresponding sound signal data is produced. For example, the relevant person can produce a signature at a bank or in the presence of some authority, under supervision, and can speak his or her own name at the same time or subsequently. In order to further improve security, the writing forces which occur while producing the signature can additionally be recorded and evaluated by means of the pressure sensor system. A further improvement in security is obtained by additional optical recording of the hand-guided writing movement, that is to say optical recording of the position data of the signature that is produced. The pen which is illustrated in FIGS. 3a-3e uses a sensor system to record a large number of personal-specific features, in particular the written image of the signature that is produced, the static and dynamic writing pressure which occurs while the writing the signature, the writing noise which is produced while writing the signature and, additionally, the word which is spoken by the person producing the writing, for example his or her name and a password. All of this data is processed to form biometric reference data, and is stored. The identification confidence and the confidence against falsification are in this case already high since widely differing personal-specific features are recorded and evaluated by the sensor system. For personal verification, the current biometric data generated by the writing system is compared with the previously generated and stored biometric reference data for that person in order to confirm whether the current biometric data largely matches the stored biometric reference data for that person. However, if there is a one hundred percent match, there is assumed to be a stolen copy of the stored reference data, and the biometric writing system 1 according to the invention emits an appropriate warning signal.

For personal identification, the current biometric data is compared with stored biometric data for a large number of people, and that person is selected whose biometric reference data best matches the current biometric data.

Figure 4:
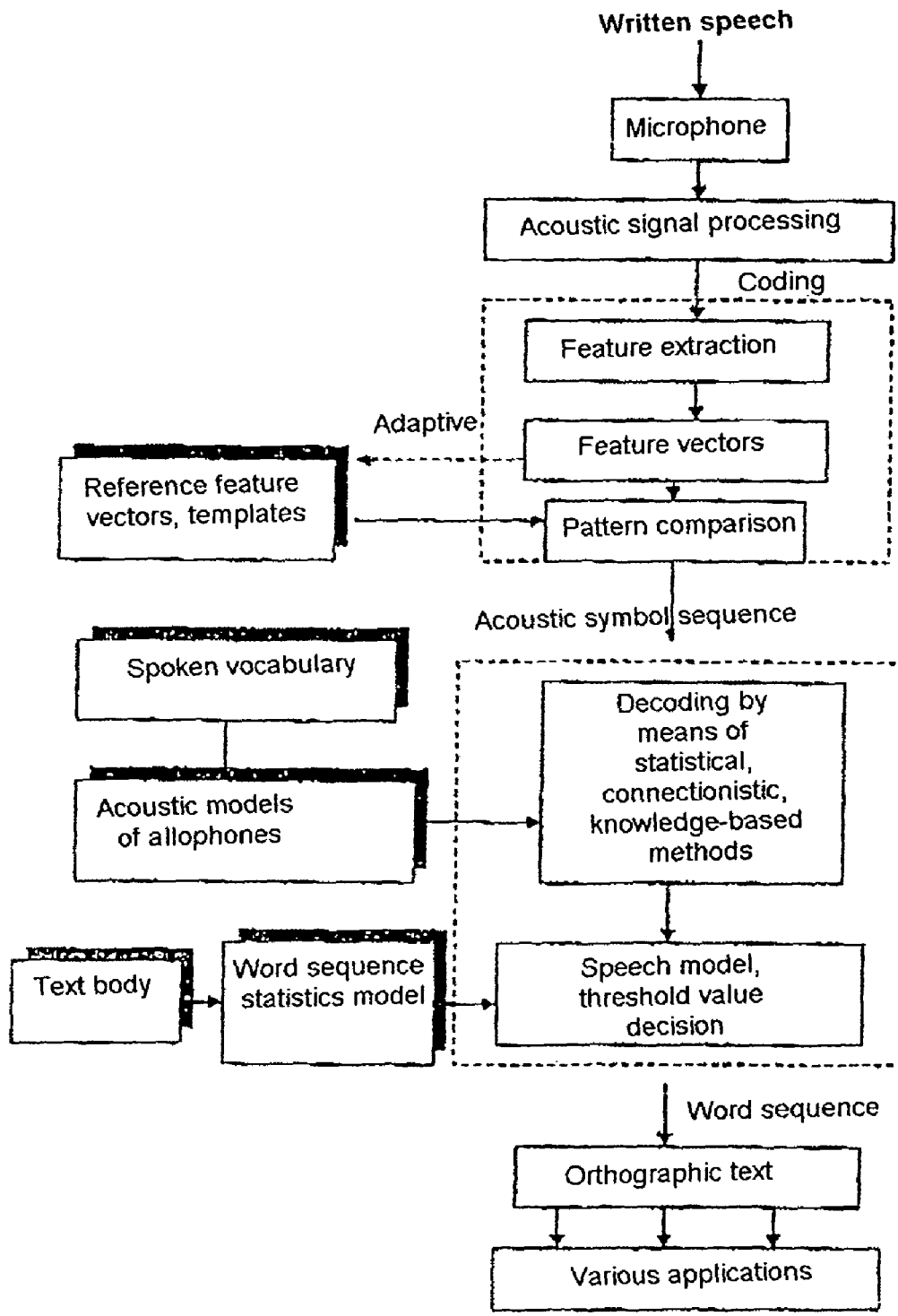
FIG. 4 shows a flowchart in order to explain handwriting identification by means of the biometric writing system according to the invention.

In addition to personal verification and personal identification, the biometric writing system according to the invention can also additionally be used for handwriting identification and/or handwritten-sketched identification. FIG. 4 shows, schematically, the steps for handwriting identification. The writing noises which occur while the pen 2 is writing on the substrate 3 while writing or sketching a character, a word or a word sequence are recorded acoustically by the microphone 5, and are converted to corresponding sound signal data. Once the acoustic signal processing is carried out, this is followed by coding. The sound signal data which is produced is temporarily stored as a digital sound time signal, and the associated frequency spectrum is then calculated from the sound signal data by means of Fourier transformation.

In a further step, first current acoustic data is determined from the sound intensity of the digital sound time signal by means of feature extraction, for data reduction. Current second acoustic data is determined from the calculated frequency spectrum of the sound time signal, likewise by means of feature extraction. This step as well is also primarily used for data reduction. Finally, a sequence of feature vectors is calculated from the acoustic data, and these calculated feature vectors are compared with stored personal-specific reference feature vectors in a pattern comparison process. A sequence of reference feature vectors which differ least from the respective feature vectors is then selected. The written character, the written word or the written word sequence is determined from the sequence of selected reference feature vectors by means of statistical, connectionistic and knowledge-based methods.

The statistical methods are, for example, hidden Markow models for identification of a relatively large vocabulary. The connectionistic methods primarily make use of neural network models for identification of a limited vocabulary. The knowledge-based methods are, for example, fuzzy logic models. The reference feature vectors are system-specific for the position of the writing system and are produced and stored on a personal-specific basis by repeatedly writing a training text by hand, before the use of the system. The reference feature vectors for that person are updated adaptively and automatically via newly written characters and words over lengthy periods of use. All the methods are based on acoustic models of characters, letters, syllables and words in the vocabulary of spoken speech. The spoken speech vocabulary is formed by spoken elements, that is to say brief spoken units (allophones) in the written noise. Each word in the vocabulary is stored as a sequence of allophones. The acoustic models use the spoken vocabulary to determine a number of word candidates which are most probably associated with the acoustic symbol sequence. The probability for each word is in this case determined via the HMM (Hidden Markow Models) or the neural fuzzy systems. The most probable word candidate is determined via a threshold value decision and via a word sequence statistics model or speech model. The character which is determined is then emitted, by way of example, as formatted text or as handwritten text. In order to improve the identification confidence, the written character or word is preferably additionally spoken like the person, and is recorded acoustically by the microphone. In addition, the position data for the hand-guided writing movement is recorded optically. A further increase in confidence is achieved by recording the writing pressure data which occurs while writing the word.

The personal-specific reference data which is generated by the writing system 1 according to the invention can be evaluated in order to determine psychological and/or physiological features of that person. In particular, the occurrence of motor-neurone movement disturbances of a person can be identified by means of the biometric writing system 1 according to the invention. The biometric writing system according to the invention is thus suitable for diagnosis of psychological and/or physiological features, and for diagnosis of motor-neurone movement disturbances of that person.

Figure 5:
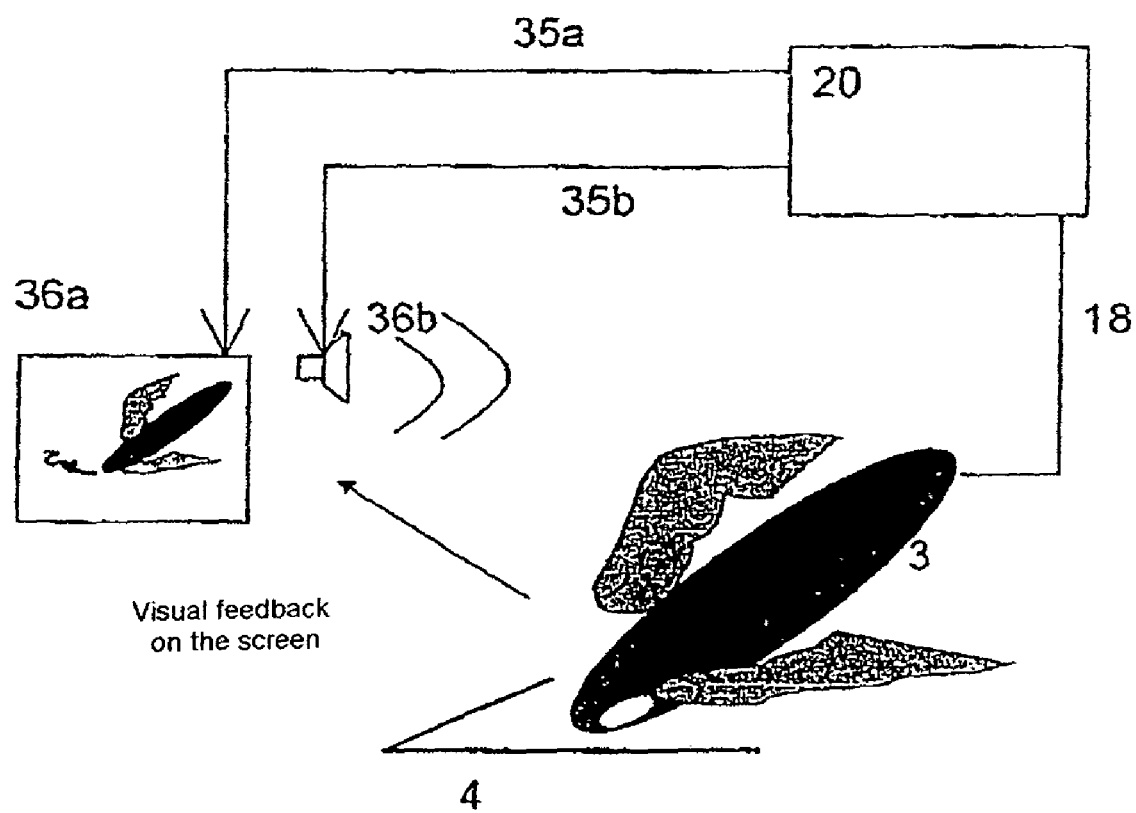
FIG. 5 shows a sketch in order to explain visual and/or acoustic feedback to the writer.

FIG. 5 shows one particularly preferred embodiment of the biometric writing system 1 according to the invention with opto-acoustic feedback for the person who is producing the writing. The biometric data which is obtained from the pen 3 is transmitted to a local computer 20, which provides opto-acoustic feedback via lines 35a, 35b to the person who is producing the writing, via a screen 36a and a loudspeaker 36b. In this configuration, the biometric writing system 1 according to the invention is suitable for use as a system for therapy for people with movement disturbances. The opto-acoustic feedback allows the person who may have a motor-neurone movement disturbance to learn to write again.

A further interesting field of application is the use of the biometric writing system 1, as is illustrated in FIG. 5, as a training system for learning to write. In particular, the biometric writing system 1 according to the invention is suitable for use as a training system for learning a language, in particular a foreign language. The person being taught may, for example, write a word on the substrate 4, and the loudspeaker which is integrated in the pen housing 3 reproduces the word in the correct spoken version of the foreign language. Predetermined numbers or characters which are produced on the substrate 4 can be copied by the person with the pen by means of a training program for students or people with coordination difficulties, for example stroke patients. By way of example, a student can copy a predetermined number for a character on the substrate 4, and receives optoacoustic feedback. Writing pressure recording allows documentation of the learning progress for people with coordination difficulties. As is illustrated in FIG. 5, it is possible to use the biometric writing system 1 according to the invention for children to learn to write the alphabet in a simple manner. Furthermore, fabrication practices, information conveyance practices and imitation practices are possible.

FIG. 6 shows the behaviour of the writing system 1 according to the invention when writing on different substrates 4. FIGS. 6a, 6b show the recorded time sound signal for different writing speeds on a cardboard surface and on a writing paper block. In this case, in the illustrated example, a line is drawn at increasing speed and the cardboard and on the writing paper block. FIGS. 6c, 6d show the associated frequency spectra.

Figure 7:
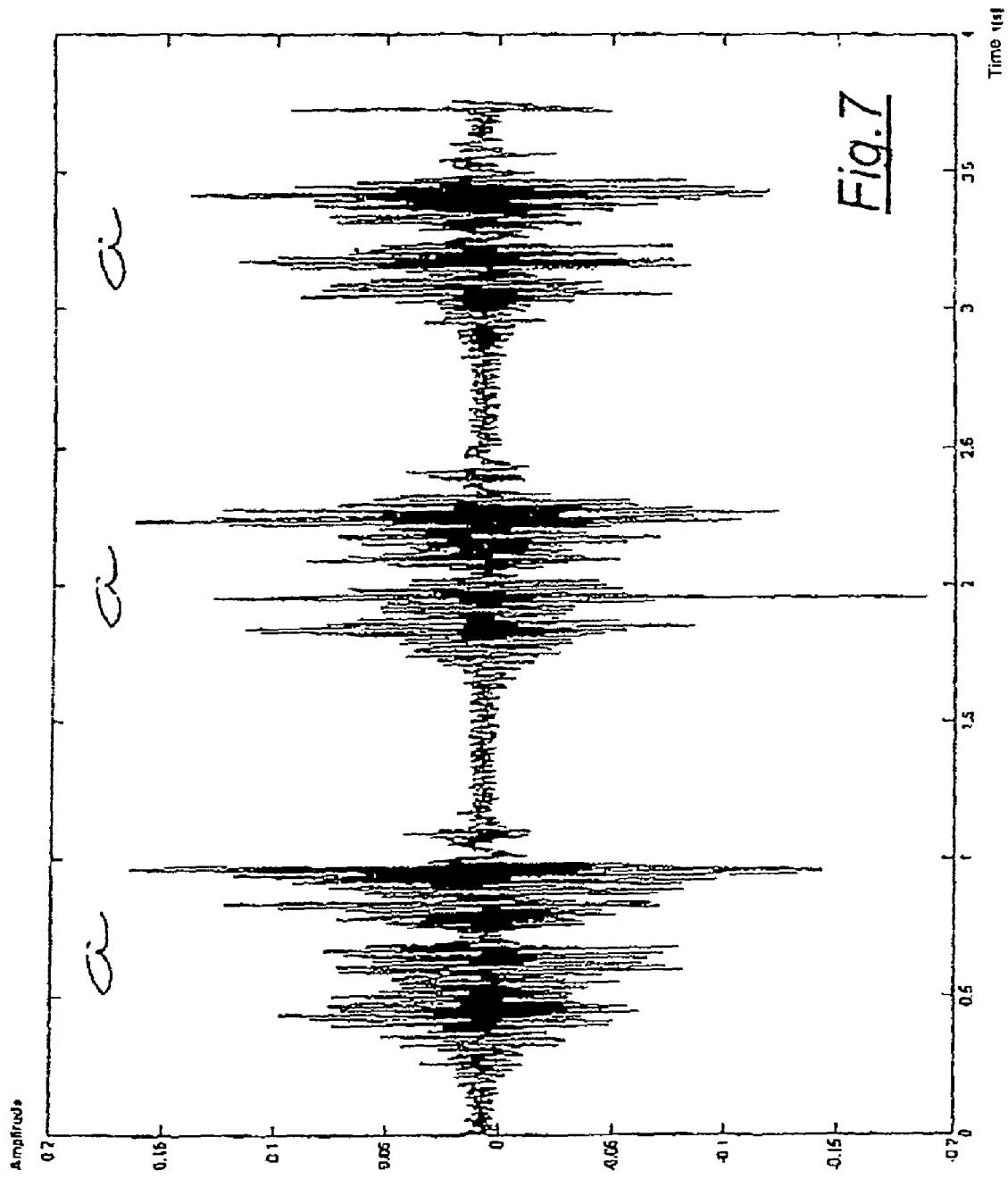
FIG. 7 shows an acoustically recorded sound time signal when writing the letter "a" three times.

FIG. 7 shows a time sound signal which is generated when the letter in the "a" is written three times, when the pen is being used to write on a writing block by means of the biometric writing system 1 according to the invention. As can be seen from FIG. 7, the sound time signal can be reproduced very well, so that the letter "a" can be identified specifically.

FIG. 8 likewise shows a time sound signal which is produced when a letter "b" is written three times. The letter "b" also has a characteristic sound time signal profile.

FIG. 9a shows amplitude frequency signals in the time profile for the letter "a", and FIG. 9b shows amplitude frequency signals in the time profile for writing the letter "b".

Figure 10A:
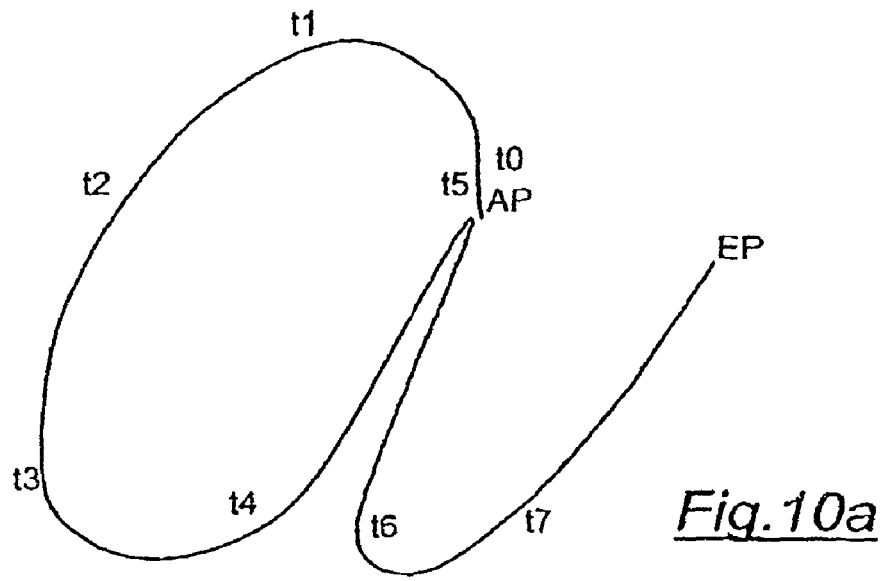
FIG. 10 shows an amplitude frequency signal when writing an associated letter in the "a"
Figure 10B:
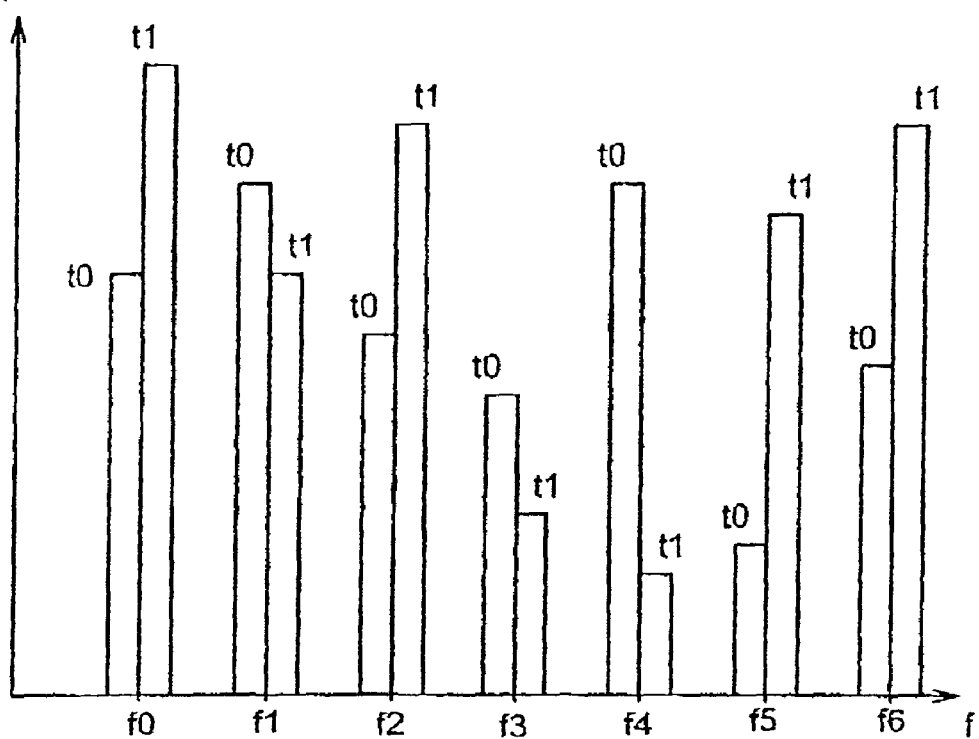

FIGS. 10a, 10b show, in principle, how the amplitude frequency lines in the time profile change dynamically while writing a letter, for example a letter "a". The person who is producing the writing places the pen on the substrate (initial point AP) at the time t0, and carries out the writing movement. The spectrum which exists at the time t0 changes dynamically in the time profile. FIG. 10b shows the change in the spectrum from the time t0 to the time t1.

Figure 11:
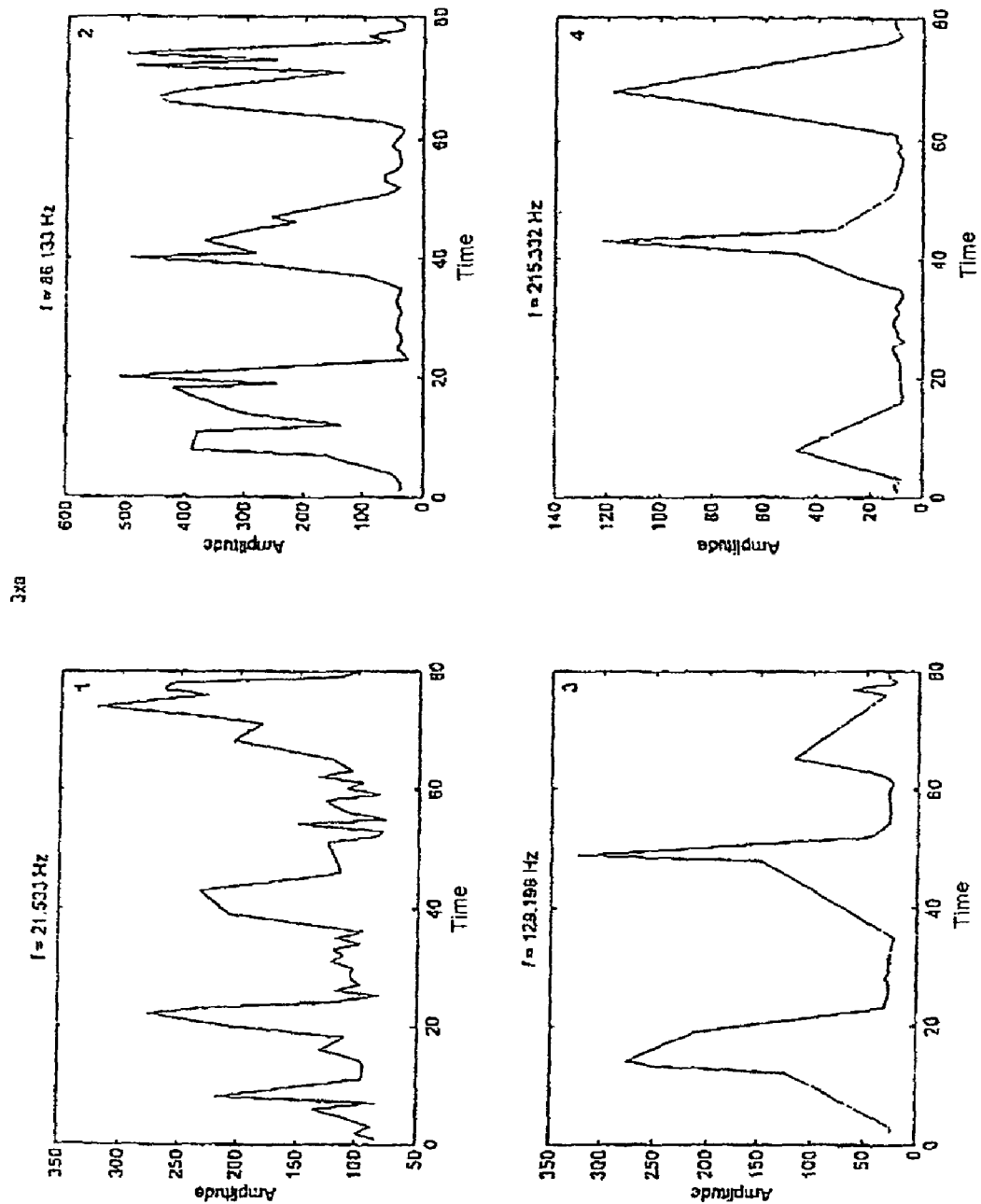
FIG. 11 shows the dynamic behaviour of a number of frequency lines when writing the letter "a"

FIG. 11 shows the dynamic response of a number of frequency lines while writing a letter "a". In the illustrated example, the best reproduction of the letter "a" occurs for the frequency line f=86.133 Hertz.

Figure 12:
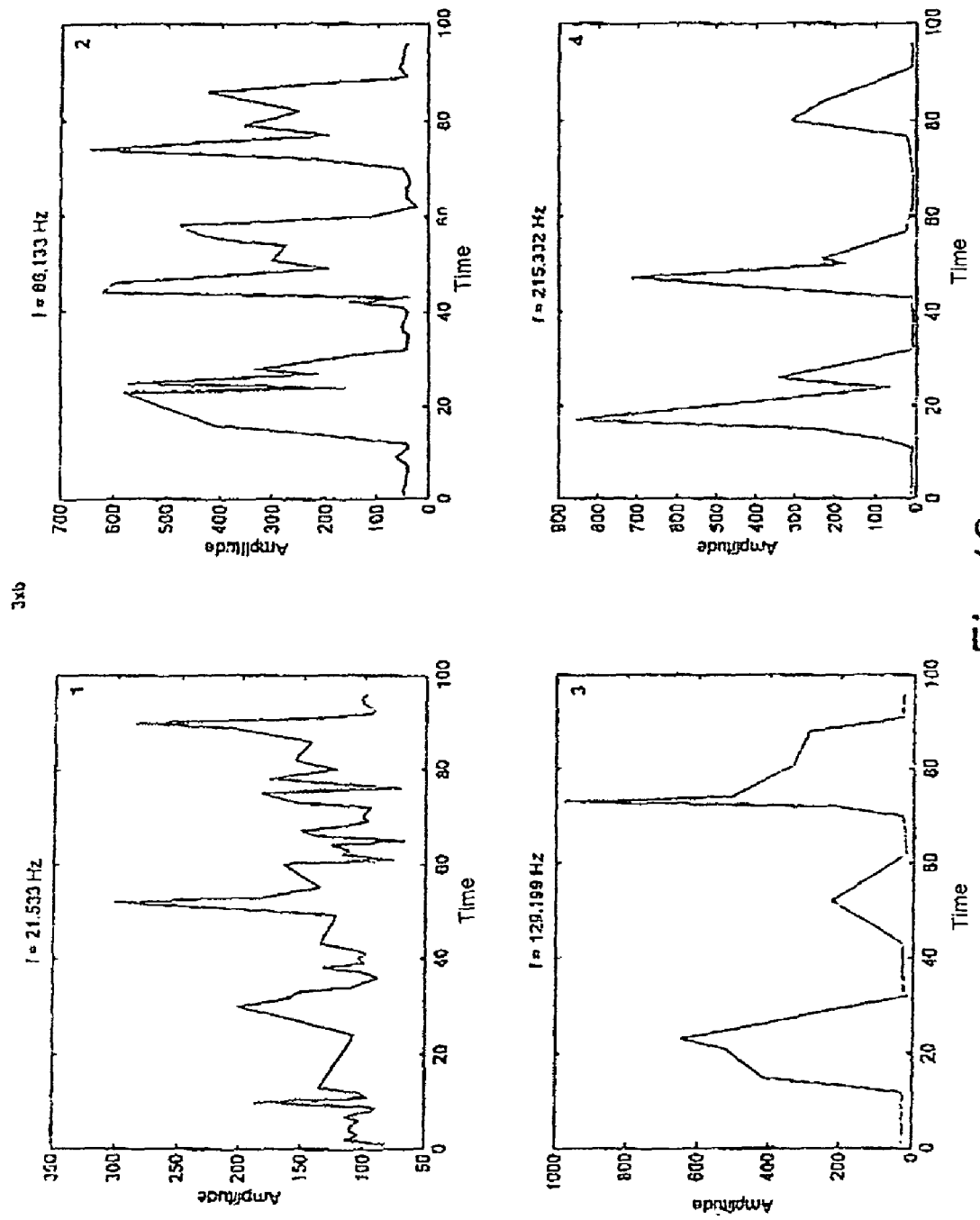
FIG. 12 shows the dynamic behaviour of a number of frequency lines when writing the letter "b"

FIG. 12 shows the dynamic response of an a number of frequency line while writing a letter "b". The best reproduction of the letter "b" is provided by the frequency line f=86.133 Hertz.

The acoustic writing system 1 according to the invention can be designed in such a way that it records the frequency lines of the handwritten characters over as wide a dynamic range as possible with large amplitude values.

The biometric acoustic writing system 1 according to the invention has a large number of application possibilities. On the one hand, it can be used as a biometric authentication system for personal identification and verification. The writing system 1 according to the invention is suitable for use in a computer input device, as a replacement for a computer mouse or keyboard commands, in particular for entering passwords. Furthermore, the biometric writing system 1 according to the invention can be used for electronic voice and handwriting identification. A further extensive field of application relates to the field of biometric diagnosis and therapy. Finally, the biometric writing system 1 according to the invention can be used for training purposes, for example for learning to write, for learning foreign languages or for correcting coordination difficulties. Important fields of use of the writing system according to the invention occur in the area of E-commerce, in particular in the Internet, for example in the case of banks, commercial organizations and for credit card matters. The biometric writing system 1 according to the invention can also be used as a biometric system for personal access and security checks in all security areas with a high degree of confidence against falsification and with low error rates. Further usage options exist for forensic purposes for criminal investigations, for border protection or for the police. Furthermore, the biometric writing system 1 according to the invention can be used for communication between people and machines, particularly as a dictation machine, or for verbal and handwritten machine control.

The multifunctional biometric writing system 1 is also suitable for use as an input unit for a future virtual desktop, in which, by way of example, the tablet of a PC can be added to or replaced, via the pen, by means of the normal writing paper, as an input medium with the input capabilities according to the invention.

The biometric writing system 1 according to the invention, as is illustrated in FIGS. 1 to 3, can be produced at low cost with relatively little technical complexity, thus opening up wide fields of use.

LIST OF REFERENCE SYMBOLS

1 Biometric acoustic writing system
2 Pen
3 Pen housing

4 Substrate
5a, 5b Microphones
6 Sound body
7 Air bearing sound chamber
8, 8a, 8b Sound insulation
9 Closure device
10 Signal line
11 Date processing unit
12 Memory unit
13 Lines
14 Optical sensor device
15 Signal lines
16 Signal lines
17 Scrambling unit
18 Data transmission path
19 Data processing unit
20 Local computer
21 Memory
22 Display device
23 Line
24 Line
25 Line
26 Reading unit
27 Control line
28 Actuator
29 Line
30 Data network
31 Database
32 Loudspeaker
33 Second optical sensor device
34 Pressure sensor device
35 Line
36 Acoustic feedback devices
37 Rechargeable battery
38 Spring
39 Fingerprint sensor
40 Inclination sensor
41 Cord
42 Spring steel holder
43 Pen refill holder
44 LED
45 Photodetector
46 Lens
47 Beam driver
48 First optical sensor device
49 Body
50 Four-quadrant photodetector

The invention claimed is:

1. Biometric, acoustic writing system having: (a) a pen housing for making hand-guided movements on a substrate; (b) at least one microphone, which is integrated in the pen housing, for acoustic recording of sound signals which are caused by the hand-guided movements; characterized by (c) having a data processing unit to calculate biometric data for personal identification as a function of sound signals that are recorded by said microphone from the hand-guided movements.

2. Biometric, acoustic writing system according to claim 1, characterized in that the data processing unit is also provided for obtaining biometric features and for reconstruction of handwritten characters and texts from the recorded sound signals.

3. Biometric, acoustic writing system according to claim 1, characterized in that a pen is provided in the pen housing, the substrate is a fixed writing substrate which has a specific pronounced surface roughness and hardness, the hand-guided movement is a writing movement and the pen, when placed on the substrate, is capable of creating friction on the substrate during the hand-guided writing movement, thereby producing an acoustic writing noise, which is capable of being transmitted to the microphone, as a structure-borne sound signal via the pen and as an airborne sound signal via surrounding air.

4. Biometric acoustic writing system according to claim 3, characterized in that the microphone is mechanically coupled to the pen in order to transmit the structure-borne sound signal.

5. Biometric, acoustic writing system according to claim 3, characterized in that the microphone is mechanically coupled to a sound body, which is connected to the pen, in order to transmit the structure-borne sound signal.

6. Biometric, acoustic writing system according to claim 5, characterized in that the sound body is in the form of a resonator for specific natural frequencies.

7. Biometric, acoustic writing system according to claim 3, characterized in that, when the housing opening is open, the microphone acoustically records the internal and external writing noise which is caused by the hand-guided writing movement as a structure-borne and airborne sound signal or acoustically records a speech signal which originates from a person or both.

8. Biometric, acoustic writing system according to claim 1, characterized in that the microphone is arranged in an air bearing sound chamber, which is provided in the pen housing with the air bearing sound chamber being in a form of a resonator for specific natural frequencies.

9. Biometric, acoustic writing system according to claim 8, characterized in that an interchangeable pen refill with an ink filling is provided as a pen in the pen housing, and the microphone and the resonator are surrounded by sound insulation, which is intended to attenuate environmental noise and passes sound signals only via the writing refill.

10. Biometric, acoustic writing system according to claim 1, characterized in that the writing substrate is composed of any desired paper.

11. Biometric, acoustic writing system according to claim 1, characterized in that a pen is provided in the pen housing, and a pressure sensor device is additionally provided, which records a static writing pressure and a dynamic writing pressure in at least one spatial direction of the pen when the pen is placed on the substrate and hand-guided.

12. Biometric writing system according to claim 11, characterized in that the pressure sensor device comprises piezoelectric sensors, piezoresistive sensors, force-sensitive resistances, magnetic sensors, or a combination thereof.

13. Biometric writing system according to claim 1, characterized in that the data processing unit is integrated in the pen housing or in an external receiving unit.

14. Biometric writing system according to claim 1, characterized in that a scrambling unit (17) is provided in the pen housing (3) in order to scramble reference data.

15. Biometric writing system according to claim 1, characterized in that a data memory is provided for storage of biometric reference data, and of data for handwritten characters, texts and spoken speech.

16. Biometric writing system according to claim 15, characterized in that the biometric reference data is calculated by the data processing unit from sound signal data which is recorded while writing and speaking at least one word, from optical movement data, from mechanical oscillation and pressure data, and from inclination data, and is stored in a reference data memory.

17. Biometric writing system according claim 16, characterized in that the data processing unit is integrated with a local computer having a computer data processing unit, and the data processing unit and the computer data processing unit compare the calculated current biometric data with the stored biometric reference data in order to verify and identify it.

18. Biometric writing system according to claim 17, characterized in that the data processing unit and the computer data processing unit produce a personal identification indication signal, a personal verification indication signal, or a combination thereof when the current biometric data largely matches the stored reference data.

19. Biometric writing system according to claim 18, characterized in that the data processing unit and the computer data processing unit identify the current biometric data as a stolen copy of the stored reference data, and produce a warning signal, if the current biometric data completely matches the stored biometric reference data.

20. Biometric writing system according to claim 16, characterized in that single characters which are currently being written are reconstructed by means of the stored biometric reference data for a person who has been identified or verified via the handwritten input.

* * * * *